US012222678B2

(12) United States Patent
Murayama et al.

(10) Patent No.: US 12,222,678 B2
(45) Date of Patent: Feb. 11, 2025

(54) MAGNETIC CARRIER, TWO-COMPONENT DEVELOPER, AND REPLENISHMENT DEVELOPER

(71) Applicant: CANON KABUSHIKI KAISHA, Tokyo (JP)

(72) Inventors: Ryuji Murayama, Chiba (JP); Yuto Onozaki, Saitama (JP); Nobuhiro Yoshida, Chiba (JP); Hironori Minagawa, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 581 days.

(21) Appl. No.: 17/582,691

(22) Filed: Jan. 24, 2022

(65) Prior Publication Data

US 2022/0236658 A1 Jul. 28, 2022

(30) Foreign Application Priority Data

Jan. 28, 2021 (JP) ................................ 2021-012504
Dec. 27, 2021 (JP) ................................ 2021-213008

(51) Int. Cl.
*G03G 9/113* (2006.01)
*G03G 9/107* (2006.01)

(52) U.S. Cl.
CPC ......... *G03G 9/1133* (2013.01); *G03G 9/1085* (2020.08)

(58) Field of Classification Search
CPC ............................ G03G 9/1133; G03G 9/1136
See application file for complete search history.

(56) References Cited

U.S. PATENT DOCUMENTS 6,130,019 A 10/2000 Nishikawa et al.
2012/0322004 A1 12/2012 Shoji et al.
2020/0073270 A1 3/2020 Matsuo et al.

FOREIGN PATENT DOCUMENTS

JP 11-231566 * 8/1999 ............... G03G 9/08
JP 2000-066455 * 3/2000 ............. G03G 9/113
JP 2002091093 A 3/2002
JP 2013003428 A 1/2013
JP 2015138230 A 7/2015

OTHER PUBLICATIONS

Translation of JP 11-231566.*
Translation of JP 2000-066455.*

* cited by examiner

*Primary Examiner* — Peter L Vajda
(74) *Attorney, Agent, or Firm* — CANON U.S.A., INC. IP DIVISION

(57) ABSTRACT

A magnetic carrier includes a magnetic core and a coating resin that covers a surface of the magnetic core. The coating resin includes a resin A and a resin B. A content of the resin A is 1 to 50% by mass, and a content of the resin B is 50 to 99% by mass, with respect to the coating resin. The resin A has a particular unit Y1 and a particular unit Y2, and the resin B contains 0.1% by mass or less of the particular unit Y2. When a mass of the resin A is represented by X, a mass of the unit Y1 is represented by Ma, and a mass of the unit Y2 is represented by Mb, $0.90 \leq (Ma+Mb)/X \leq 1.00$ and $1.00 \leq Ma/Mb \leq 30.0$ are satisfied, and also $0 \leq |SPa-SPb| \leq 2.0$ is satisfied.

10 Claims, 4 Drawing Sheets

MAGNETIC CARRIER, TWO-COMPONENT DEVELOPER, AND REPLENISHMENT DEVELOPER

BACKGROUND OF THE INVENTION

Field of the Invention

The present disclosure relates to a magnetic carrier, two-component developer and replenishment developer which are used in an image forming method for visualizing an electrostatic charge image with the use of electrophotography.

Description of the Related Art

Conventionally, in the image forming method of the electrophotographic method, a method is generally used which includes forming a latent electrostatic image on a latent electrostatic image carrier with the use of various units, attaching toner to the latent electrostatic image, and developing the latent electrostatic image. In this development, a two-component developing method is widely adopted which includes mixing a carrier particle referred to as a magnetic carrier with toner, triboelectrically charging the toner to impart an appropriate amount of positive or negative charge to the toner, and developing the toner while using the electric charge as a driving force.

The two-component developing method can impart functions such as stirring, transporting and charging of the developer, to the magnetic carrier, accordingly clarifies sharing of functions between the magnetic carrier and the toner, and because of this, has such advantages as to have satisfactory controllability for a developer performance. Here, in many cases, the magnetic carrier has a structure that includes a core for acquiring transportability by having magnetism, and a coating resin that covers the core and allows the core to acquire charge imparting capability to the toner.

In recent years, due to technical evolution in a field of the electrophotography, the longer life of a main body is required at a higher level, and it is required that the carrier maintains the charge imparting capability even in long-term use, but it is generally known that the charge imparting capability of the carrier decreases due to a reduction of charging sites caused by adhesion of toner components, and harmful effects occur in the image such as a change in the tint.

As a unit for acquiring durability against the above described adhesion of the toner components (hereinafter referred to as “stain resistance”), an example has been adopted that uses a silicone resin or the like, which is a material having low surface free energy, as the coating resin (Japanese Patent Application Laid-Open No. 2002-91093).

However, in general, a material having the low surface free energy, such as silicone resins, can reduce the adhesion of the toner components and the like, but has such a property that the interaction between molecules is weak and the material tends to be easily destroyed by an external force or the like. Because of this, when the silicone resin is used as the coating resin for the carrier, the coating resin is worn due to the mechanical load or the like, which is generated at the time of stirring, conveyance or the like in a developing device, (hereinafter referred to as “wear resistance”); and as a result of decrease in the surface resistance of the carrier due to the wear of the coating resin, the charge imparting capability of the carrier has decreased, in some cases (Japanese Patent Application Laid-Open Nos. 2002-91093, 2015-138230 and 2013-3428).

In order to acquire the above wear resistance, an example can be considered that uses a silicone-modified resin in which trifunctional silicon is bonded to its terminal; but it is known that this structure cannot sufficiently decrease the surface free energy of the carrier surface and accordingly does not improve the stain resistance (Japanese Patent Application Laid-Open No. 2015-138230). On the other hand, when a resin having a silicone structure in a side chain is employed as a structure for further decreasing the surface free energy, it has been confirmed that the surface free energy between molecules results in becoming small, and the wear resistance becomes insufficient as in the case of using the above described silicone resin (Japanese Patent Application Laid-Open No. 2013-3428).

In other words, in order to realize a highly stable carrier, it is required to simultaneously acquire both of the stain resistance for reducing the adhesion of the toner components and the wear resistance for reducing the wear of the coat due to the mechanical load or the like.

SUMMARY OF THE INVENTION

From the above, an aspect of the present disclosure is to provide a stable carrier having the stain resistance and the wear resistance, which realizes decrease of fogging, decrease of scattering of the toners, stable image density, and developability, even in the case of long-term use in the image forming method by the two-component developing method.

As a result of intensive studies, the present inventors have found that a carrier can acquire stain resistance and wear resistance by employing a resin A and a resin B shown in the following structures. The resin A has a structure in which a silicone structure similar to that of the silicone resin is grafted to the main chain; and this silicone structure causes the decrease of the surface free energy, and improves the stain resistance. In addition, the resin B has a structure having high compatibility with the main chain of the resin A, and accordingly the resin A and the resin B are mixed with each other; and thereby, the wear resistance is improved. As described above, in the case where only a resin is used in which a silicone structure is grafted, such as the resin A, the wear resistance of the carrier has been insufficient; but the carrier can acquire the wear resistance as well, by employing the resin A together with the resin B having high compatibility with the main chain of the resin A, which causes strong interaction between the main chain of the resin A and the resin B.

Specifically, one embodiment of the present disclosure provides a magnetic carrier including: a magnetic core; and a coating resin that covers a surface of the magnetic core, wherein

- the coating resin includes a resin A and a resin B;
- a content of the resin A is 1 to 50% by mass, and a content of the resin B is 50 to 99% by mass, with respect to the total mass of the coating resin;
- the resin A has a unit Y1 represented by formula (1) and a unit Y2 represented by formula (2), and
- in the resin B, a content of the unit Y2 represented by formula (2) is 0.1% by mass or less; and
- when a mass of the resin A, a mass of the unit Y1 in the resin A, and a mass of the unit Y2 in the resin A are represented by X, Ma and Mb, respectively, the X, the Ma and the Mb satisfy expressions (a) and (b):

$$0.90 \leq (Ma+Mb)/X \leq 1.00 \quad \text{(a), and}$$

$$1.00 \leq Ma/Mb \leq 30.0 \quad \text{(b),}$$

and when an SP value of the unit Y1 and an SP value of the resin B are represented by SPa and SPb, respectively, the SPa and the SPb satisfy expression (c):

$$0 \leq |SPa-SPb| \leq 2.0 \quad \text{(c),}$$

wherein in formula (1), $R_1$ represents H or $CH_3$, and $R_2$ represents a hydrocarbon group having 1 to 8 carbon atoms and optionally having a substituent, wherein the substituent is a hydroxy group or a carboxy group; and in formula (2), $R_3$ represents H or $CH_3$, $R_4$ represents H or $CH_3$, $R_5$ represents a single bond or a hydrocarbon group having 1 to 10 carbon atoms, $R_6$ represents a hydrocarbon group having 1 to 10 carbon atoms, $R_7$ represents H, $CH_3$ or $Si(CH_3)_3$, and n represents an integer of 2 to 150

(1)

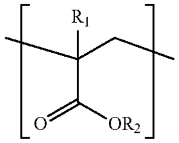

(2)

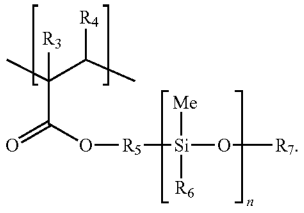

In addition, another embodiment of the present disclosure is to provide two-component developer that includes the magnetic carrier and a toner.

In addition, further another embodiment of the present disclosure is to provide a replenishment developer that includes the magnetic carrier and a toner.

According to the present disclosure, there is provided a stable carrier having the stain resistance and the wear resistance, which realizes decrease of fogging, decrease of scattering of the toners, stable image density, and developability, even in long-term use.

Further features of the present disclosure will become apparent from the following description of exemplary embodiments with reference to the attached drawings.

DESCRIPTION OF THE EMBODIMENTS

Figure 1:
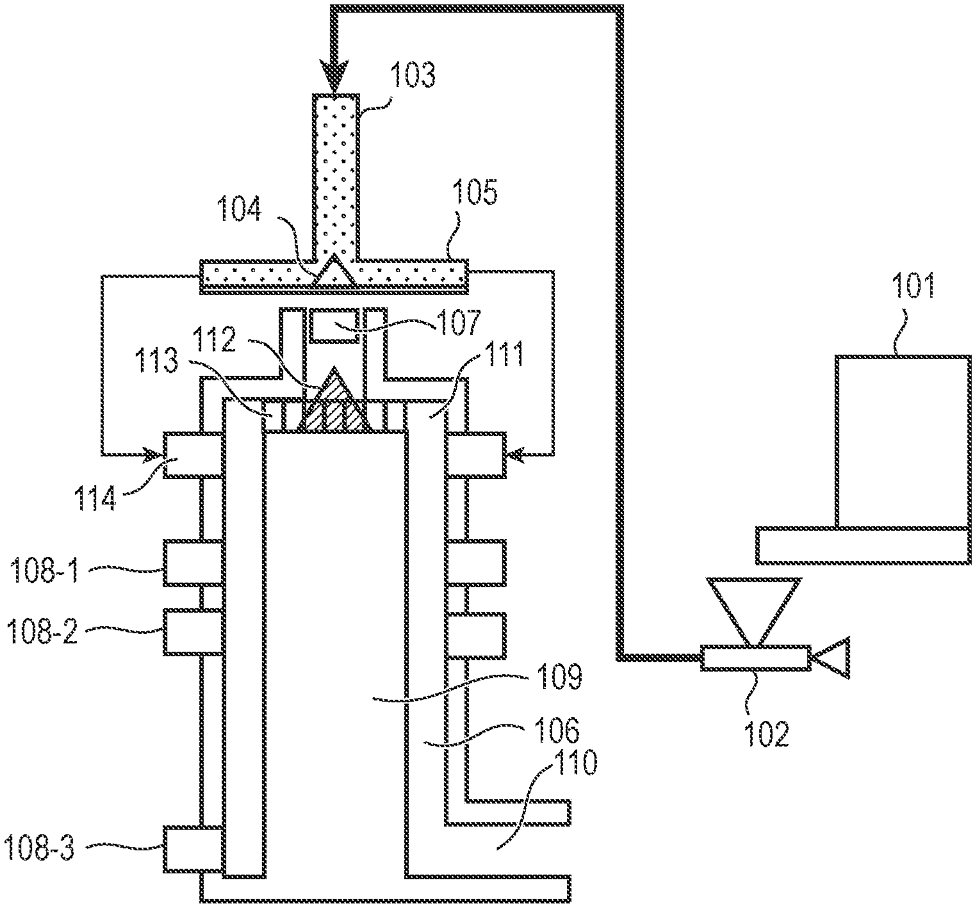
FIG. 1 is an example of a schematic view of a surface treatment apparatus.
Figure 2:
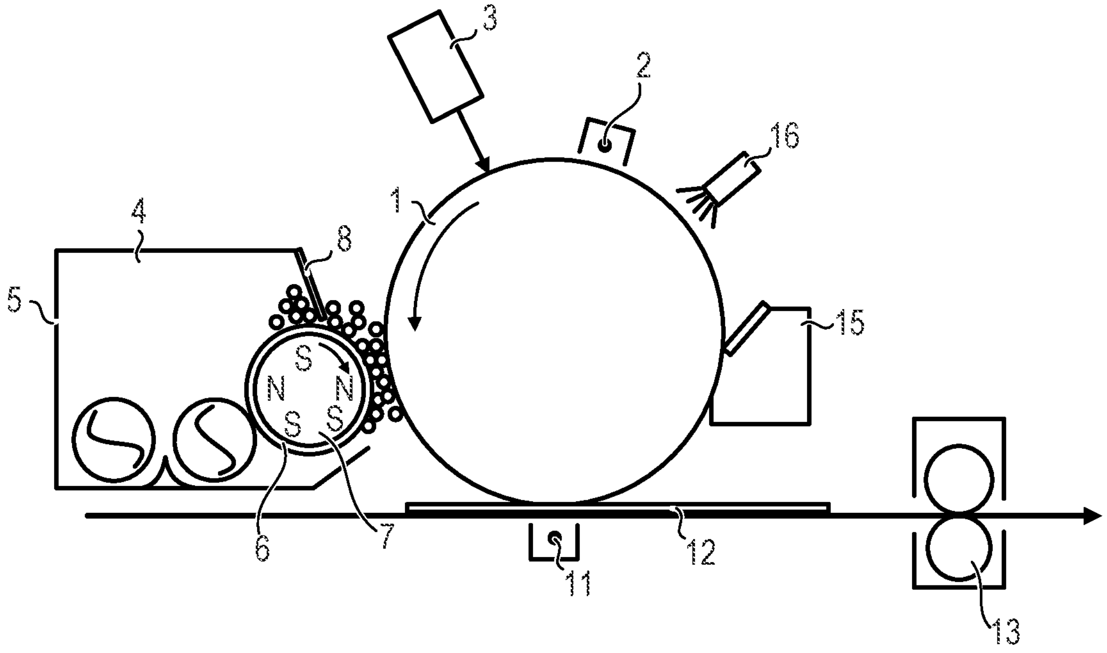
FIG. 2 is an example of a schematic view of an image forming apparatus.
Figure 3:
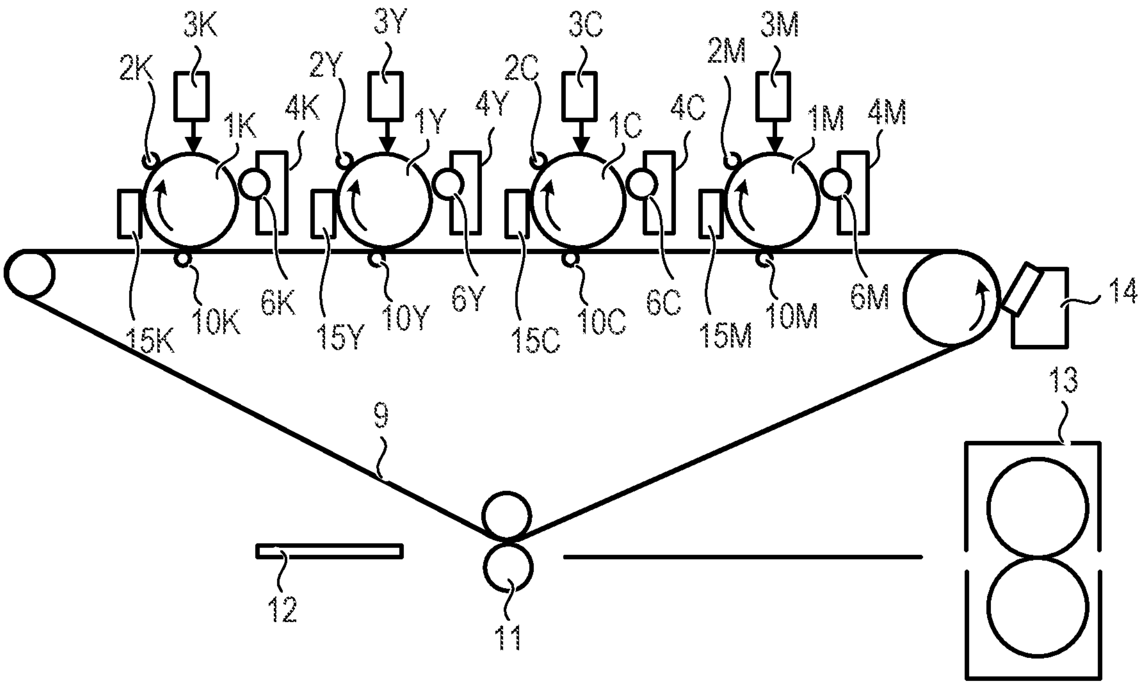
FIG. 3 is an example of a schematic view of a full-color image forming apparatus to which the image forming method is applied.

Preferred embodiments of the present disclosure will now be described in detail in accordance with the accompanying drawings.

In the present disclosure, the description of "XX or more and YY or less" or "XX to YY" which represents a numerical range means a numerical range that includes a lower limit and an upper limit which are end points, unless otherwise specified.

A magnetic carrier of the present disclosure is a magnetic carrier including: a magnetic core; and a coating resin that covers a surface of the magnetic core, wherein the coating resin includes a resin A and a resin B;

a content of the resin A is 1 to 50% by mass, and a content of the resin B is 50 to 99% by mass, with respect to the coating resin;

the resin A has a unit Y1 represented by the following formula (1) and a unit Y2 represented by the following formula (2), and in the resin B, a content of the unit Y2 represented by the following formula (2) is 0.1% by mass or less; and when a mass of the resin A, a mass of the unit Y1 in the resin A, and a mass of the unit Y2 in the resin A are represented by X, Ma and Mb, respectively, the X, the Ma and the Mb satisfy the following expressions (a) and (b):

$$0.90 \leq (Ma+Mb)/X \leq 1.00 \quad \text{(a), and}$$

$$1.00 \leq Ma/Mb \leq 30.0 \quad \text{(b), and}$$

when an SP value of the unit Y1 and an SP value of the resin B are represented by SPa and SPb, respectively, the SPa and SPb satisfy the following expression (c):

$$0 \leq |SPa-SPb| \leq 2.0 \quad \text{(c),}$$

wherein in the formula (1), $R_1$ represents H or $CH_3$, and $R_2$ represents a hydrocarbon group having 1 to 8 carbon atoms and optionally having a substituent, wherein the substituent is a hydroxy group or a carboxy group; and in the formula (2), $R_3$ represents H or $CH_3$, $R_4$ represents H or $CH_3$, $R_5$ represents a single bond or a hydrocarbon group having 1 to 10 carbon atoms, $R_6$ represents a hydrocarbon group having 1 to 10 carbon atoms, $R_7$ represents H, $CH_3$ or $Si(CH_3)_3$, and n represents an integer of 2 to 150

(1)

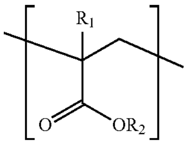

-continued (2)

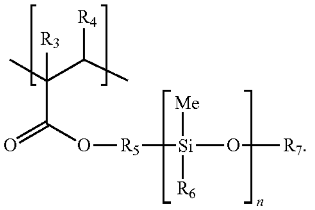

As described above, when only a resin having a low surface free energy, such as a silicone resin, is used as the coating resin, the wear resistance has deteriorated. The carrier of the present disclosure includes a resin A and a resin B, and the resin A has a structure similar to that of the silicone resin, and has a structure in which the structure is grafted to the main chain; and this silicone structure causes the decrease of the surface free energy, and improves the stain resistance. In addition, as will be described later, the resin B has a structure having high compatibility with the main chain of the resin A, and accordingly the resin A and the resin B tend to resist causing the peeling due to a mechanical load such as shear generated by a developing device; and the wear resistance is improved.

The resin A has the unit Y1 represented by the above formula (1) and the unit Y2 represented by the following formula (2). The unit Y2 has a silicone structure, and this structure decreases the surface free energy, and thereby improves the stain resistance.

In the unit Y1 in the formula (1), $R_1$ represents H or $CH_3$, and $R_2$ represents a hydrocarbon group having 1 to 8 carbon atoms and optionally having a substituent, and is preferably an alkyl group having 1 to 6 carbon atoms and optionally having a substituent. The substituent in $R_2$ is a hydroxy group or a carboxy group. As for a specific method of introducing $R_1$ and $R_2$, the $R_1$ and the $R_2$ can be introduced by copolymerizing the following monomers, for example, when the resin A is polymerized: methyl acrylate, ethyl acrylate, propyl acrylate, butyl acrylate, hexyl acrylate, cyclobutyl acrylate, cyclohexyl acrylate, cyclopentyl acrylate, cyclooctyl acrylate, methyl methacrylate, ethyl methacrylate, propyl methacrylate, butyl methacrylate, hexyl methacrylate, cyclobutyl methacrylate, cyclohexyl methacrylate, cyclopentyl methacrylate, cyclooctyl methacrylate, 2-hydroxyethyl acrylate, 2-carboxyethyl acrylate, 2-hydroxyethyl methacrylate, and 2-carboxyethyl methacrylate.

In the unit Y2, $R_3$ represents H or $CH_3$, $R_4$ represents H or $CH_3$, and $R_5$ represents a single bond or a hydrocarbon group having 1 to 10 carbon atoms, and is preferably alkylene having 1 to 6 carbon atoms; $R_6$ represents a hydrocarbon group having 1 to 10 carbon atoms, and is preferably an alkyl group or a phenyl group having 1 to 6 carbon atoms; and $R_7$ represents H, $CH_3$ or $Si(CH_3)_3$, and n represents an integer of 2 to 150. As for a specific method of introducing these substituents, the substituents can be introduced by copolymerizing an acrylic acid ester, a methacrylic acid ester, or a 2-butenoic acid ester, in any of which a silicone structure is esterified, for example, when the resin A is polymerized.

In the resin A, when a mass of the resin A, a mass of the unit Y1, and a mass of the unit Y2 are represented by X, Ma and Mb, respectively, the X, the Ma and the Mb satisfy the following expressions (a) and (b).

$$0.90 \leq (Ma+Mb)/X \leq 1.00 \qquad \text{(a)}$$

$$1.00 \leq Ma/Mb \leq 30.0 \qquad \text{(b)}$$

This relational expression indicates that the resin A contains the unit Y1 and the unit Y2 in an amount of 90% by mass or more of all the units, and that the unit Y1 has a mass between the same mass as and 30 times as heavy as that of the unit Y2. When the (Ma+Mb)/X is less than 0.90, the compatibility with the resin B decreases and the wear resistance deteriorates, or the surface free energy decreases and the stain resistance deteriorates. Consequently, any case is not preferable. In addition, when Ma/Mb is smaller than 1.00, the structure of the resin A becomes a structure in which a proportion of the unit Y2 to the unit Y1 is too high, the surface free energy becomes too small, and accordingly the wear resistance deteriorates. In contrast to this, when Ma/Mb becomes larger than 30, the surface free energy becomes too high, and accordingly the stain resistance deteriorates.

A proportion of the resin A contained in the coating resin is 1 to 50% by mass. When the proportion of the resin A contained in the coating resin is smaller than 1% by mass, the surface free energy does not decrease, and accordingly the stain resistance becomes insufficient. When the proportion of the resin A contained in the coating resin becomes larger than 50% by mass, the decrease in the intermolecular force, which originates in that the surface free energy is low, becomes larger than the wear resistance that can be obtained by an interaction with the resin B; and accordingly, the wear resistance becomes insufficient. The proportion of the resin A contained in the coating resin is preferably in a range of 1 to 20% by mass, and is more preferably in a range of 3 to 20% by mass.

The proportion of the resin B contained in the coating resin is 50 to 99% by mass. When the proportion of the resin B contained in the coating resin is smaller than 50% by mass, the resin strength becomes insufficient, and accordingly, the wear resistance deteriorates. When the proportion of the resin B contained in the coating resin is larger than 99% by mass, the effect of the component having the low surface free energy becomes insufficient, and accordingly, the stain resistance deteriorates. The proportion is preferably 80 to 99% by mass.

When the SP value of the unit Y1 and the SP value of the resin B are represented by SPa and SPb, respectively, the SPa and SPb satisfy the following expression (c).

$$0 \leq |SPa-SPb| \leq 2.0 \qquad \text{(c)}$$

The above SP value is calculated by the following method.

$$SP \text{ value} = \sqrt{(Ev/v)} = \sqrt{(\Sigma\Delta ei/\Sigma\Delta vi)} \qquad \text{Expression:}$$

In the expression, Ev: evaporation energy (J/mol), v: molar volume ($cm^3$/mol), Δei: evaporation energy of each atom or atomic group, and Δvi: a molar volume of each atom or atomic group.

When the above relational expression (c) is satisfied, the compatibility between the resin A and the resin B enhances, and the wear resistance is improved. When the |SPa−SPb| becomes larger than 2.0, the compatibility between the resin A and the resin B is low, and the interaction between the molecules decreases, and accordingly the wear resistance deteriorates. The smaller the |SPa−SPb| is, the higher the compatibility is, and when the |SPa−SPb| is 1.0 or smaller, the wear resistance is further improved, which is therefore preferable.

When m is represented by the sum of the number of units Y1 and the number of units Y2, the resin A preferably satisfies the following expression (d).

$$50 \leq m \leq 250 \quad (d)$$

When m is 50 or larger, the molecular weight becomes sufficiently high, and accordingly, the wear resistance is further improved; and when m is 250 or smaller, the interaction between the resin A and the resin B further enhances, and accordingly the wear resistance and the stain resistance are further improved.

In the magnetic carrier of the present disclosure, it is preferable that Si on the surface of the magnetic carrier as measured by electron spectroscopy for chemical analysis (ESCA) be 1.0 to 15.0 atom %. When the Si is 1.0 atom % or more, the surface free energy of the carrier can be lowered, and accordingly, the stain resistance is further improved. When the Si is 15.0 atom % or less, the intermolecular interaction in the vicinity of the carrier surface enhances, and accordingly, the wear resistance is further improved.

The atomic concentration of Si is measured in the following way.

<Method for Measuring Atomic Concentration of Si by XPS>

A magnetic carrier is affixed onto an indium foil. At this time, the particles are uniformly affixed thereon so that the indium foil portion is not exposed.

The measurement conditions are as follows.

Apparatus: PHI5000 VERSAPROBE II (Ulvac-Phi, Inc.)
Irradiation ray: Al Kα ray
Output: 25 W 15 kV
Pass Energy: 58.7 eV
Stepsize: 0.125 eV
XPS peaks: C 1 s, O 1 s, Si 2 p, Ti 2 p, and Sr 3 d In the resin A, n in the formula (2) represents a length of a side chain that is formed by the silicone structure of the silicone-grafted structure. When n is 2 to 150, the surface free energy of the coating resin on the carrier can be lowered. When n is 1 or smaller, the surface free energy cannot be lowered, and accordingly the stain resistance deteriorates. When n is larger than 150, the interaction between the resin A and the resin B becomes small, and accordingly the wear resistance deteriorates. When n is 5 or larger and 60 or smaller, the wear resistance and the stain resistance are improved, which is consequently preferable.

The resin A may have a functional group such as a nitrogen-containing group, a carboxyl group and a hydroxyl group. By having these functional groups, the resin A can suppress electrostatic charge up of the developer, particularly in a low-humidity environment. In addition, when the resin A has a hydroxyl value, an effect due to a hydrogen bond is also exhibited, and accordingly the wear resistance is further improved, which is consequently preferable.

When the resin A has employed the carboxyl group, a preferred range of the acid value thereof is 5 to 100 mgKOH/mg. When the acid value of the resin A is 5 or higher, the electrostatic charge-up is improved, and when the acid value of the resin A is 100 or lower, the charge retentivity of the developer is improved.

When the resin A has employed a hydroxyl group, a preferred range of the hydroxyl value thereof is 5 to 50 mgKOH/mg. When the hydroxyl value of the resin A is 5 or higher, the electrostatic charge-up is improved, and when the hydroxyl value of the resin A is 50 or lower, the charge retentivity of the developer is improved.

As the resin B, such a resin is preferably used that when the SP value of the unit Y1 and the SP value of the resin B are represented by SPa and SPb, respectively, the SPa and SPb satisfy the following expression (c):

$$0 \leq |SPa - SPb| \leq 2.0 \quad (c)$$

However, the structure is not particularly limited, and for example, such resins can be used as to be acrylic resins, urethane resins, and polyethylene, polyethylene terephthalate, polystyrene and phenol resins.

It is preferable that the resin B be an acrylic resin, from the viewpoint that the SP value of the resin B is closer to the SP value of the resin A, and the compatibility with the resin A enhances.

As for the structure of the resin B, it is preferable that the resin B have the unit Y1, because the difference of the SP values between the resin B and the resin A becomes small and accordingly the compatibility enhances, and it is more preferable that the resin B contain 75% by mass or more of the unit Y1.

It is preferable for the resin B to contain the unit Y3 shown in the following formula (3), and is preferable to contain 1 to 75% by mass of the unit Y3

(3)

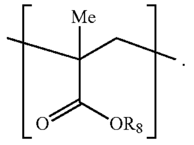

In formula (3), $R_8$ represents a cyclohexyl group, a cycloheptyl group, a cyclooctyl group, a cyclopentyl group, a cyclobutyl group or a cyclopropyl group.

It is preferable that the resin B have an alicyclic hydrocarbon group, as is contained in the unit Y3, because the surface (coating film surface) of the resin coating layer becomes thereby smooth which covers the surface of the magnetic core; suppresses the adhesion of the toner and components originating in the toner, such as external additives that impart fluidity to the toner; and the stain resistance is further improved. The unit Y3 may contain only one type of structure, or may contain two or more types of structures.

At the time of the synthesis of the resin B, it is preferable to use a (meth)acrylic acid ester monomer having the alicyclic hydrocarbon group in a range of 50 to 90 parts by mass, when all the monomers to be used for the synthesis of the resin B are set at 100 parts by mass.

It is preferable for the weight average molecular weight (Mw) of the resin B to be 20,000 to 120,000, and is more preferable to be 30,000 to 100,000, from the viewpoint of the stability of covering.

It is preferable for the acid value of the resin B to be 0 to 3.0 mgKOH/g, is more preferable to be 0 to 2.8 mgKOH/g, and is particularly preferable to be 0 to 2.5 mgKOH/g. When the acid value of the resin B is 3.0 mgKOH/g or lower, self-cohesion of the resin due to the influence of the acid value resists occurring, and the smoothness of the surface (coating film surface) of the resin coating layer resists decreasing. The acid value of the resin B can be controlled by using a monomer having a polar group such as a carboxy group or a sulfo group (sulfonic group), at the time of the synthesis of the coating resin A, and adjusting the amount of the monomer to be added. However, it is preferable that the acid value of the resin A be low, and it is preferable not to use a monomer having a polar group. Even in the case where the resin is synthesized with the use of only a monomer that forms an ester bond, an acid value is slightly generated in the synthesized resin, in some cases. This is considered to be because a part of the ester bond is decomposed to generate a carboxyl group, at the time of the synthesis (polymerization) of the resin.

It is preferable that the resin B be a polymer (copolymer) obtained by copolymerizing a (meth)acrylic acid ester monomer having an alicyclic hydrocarbon group, with a macromonomer. When a macromonomer is used in the synthesis of the resin B, an adhesiveness between the resin coating layer and the magnetic core is enhanced, and the charge imparting capability of the magnetic carrier with respect to the toner is enhanced.

The above macromonomer is preferably a macromonomer that is obtained by polymerizing at least one selected from the group consisting of methyl acrylate, methyl methacrylate, butyl acrylate, butyl methacrylate, 2-ethylhexyl acrylate, 2-ethylhexyl methacrylate, styrene, acrylonitrile and methacrylonitrile.

It is preferable for the weight average molecular weight (Mw) of the macromonomer to be 2000 to 10000, and is more preferable to be 3000 to 8000.

At the time of the synthesis of the resin B, it is preferable to use a macromonomer in a range of 5.0 to 40.0 parts by mass, when all the monomers to be used for the synthesis of the coating resin A are set at 100 parts by mass.

At the time of synthesis of the resin B, particularly a methacrylic acid ester monomer is mixed, and then molecules are more strongly entangled and an adhesiveness of the coating resin to the magnetic core is enhanced. As a result, the coating is not peeled off even though having received a load due to a stirring member or the like in the developing device, can maintain a stable charge amount imparting capability for a long period of time, and can output images of high quality.

It is preferable that the resin coating of the present disclosure contain an electroconductive particulate. The electroconductive particulate can appropriately control the specific resistance of the carrier for electrophotography. As a result, a counter charge after development of the toner can be released, and a white patch can be reduced. It is preferable that the content of the electroconductive particulate to be added to the coating resin be 0.1 to 20 parts by mass with respect to 100 parts by mass of the coating resin. When the content of the electroconductive particulate is less than 0.1 parts by mass, it is difficult to obtain an effect of an addition of the electroconductive particulate, and when the content of the electroconductive particulate exceeds 20 parts by mass, there is a concern that the color tone may be lowered due to the detachment of the electroconductive particulate. Examples of the electroconductive particulate include carbon black, titanium oxide and silver.

In addition, a particulate may be contained in the coating resin for the purpose of enhancing the charge imparting capability to the toner and improving the releasability. The particulate contained in the resin coating may be a particulate of any of an organic material and an inorganic material, but is preferably a crosslinked resin particulate or an inorganic particulate, any of which has a strength that can keep the shape of the particulate at the time of coating. Examples of the crosslinked resin that forms the crosslinked resin particulate include crosslinked polymethyl methacrylate resin, crosslinked polystyrene resin, melamine resin, guanamine resin, urea resin, phenol resin and nylon resin. Examples of the inorganic particulate include silica, alumina and titania.

It is preferable that the content of the particulate in the coating resin be 0.1 to 20 parts by mass, with respect to 100 parts by mass of the coating resin.

The magnetic core particle of the present disclosure can employ known magnetic particles such as magnetite particles, ferrite particles, and magnetic material-dispersed type resin particles. In particular, a magnetic particle that is obtained by filling the pore of a magnetic particle having a porous shape with a resin, or the magnetic material-dispersed type resin particle, in other words, a magnetic particle containing a magnetic oxide and a resin composition is preferable from the viewpoint of achieving a long life, because of being capable of decreasing the specific gravity of the magnetic carrier.

The magnetic carrier having the specific weight decreased, for example, reduces a load against the toner in a state of the developer in the developing device, can prevent the adhesion of the toner component to the surface of the magnetic carrier, and also reduces the load between carriers, which leads to further reduction of peeling, chipping and scraping of the resin coating layer. In addition, it is enabled to improve dot reproducibility and obtain a high-definition image.

For information, as a resin to be contained in the pore of the magnetic particle having the porous shape, a copolymer resin to be used as the coating resin can be used, but the resin is not limited thereto, and known resins such as thermoplastic resins and thermosetting resins can be used.

As the thermoplastic resin, the copolymer to be used as the coating resin is preferable, but other examples include the following: polystyrene, polymethyl methacrylate, a styrene-acrylic acid ester copolymer, a styrene-methacrylic acid ester copolymer, a styrene-butadiene copolymer, an ethylene-vinyl acetate copolymer, polyvinyl chloride, polyvinyl acetate, polyvinylidene fluoride resin, a fluorocarbon resin, a perfluorocarbon resin, a solvent-soluble perfluorocarbon resin, polyvinylpyrrolidone, a petroleum resin, a novolac resin, a saturated alkyl polyester resin, an aromatic polyester resin such as polyethylene terephthalate, polybutylene terephthalate and polyarylate, polyamide resin, polyacetal resin, a polycarbonate resin, a polyether sulfone resin, a polysulfone resin, polyphenylene sulfide resin and a polyether ketone resin.

Examples of the thermosetting resin include the following chemical compounds: phenol resin, a modified phenol resin, maleic resin, an alkyd resin, an epoxy resin, acrylic resin, unsaturated polyesters obtained by polycondensation of maleic anhydride, terephthalic acid and a polyhydric alcohol, urea resin, melamine resin, urea-melamine resin, xylene resin, toluene resin, guanamine resin, melamine-guanamine resin, acetoguanamine resin, glyptar resin, furan resin, silicone resin, polyimide and polyamide-imide resins, a polyetherimide resin, and polyurethane resin.

Examples of the method for filling the voids of the ferrite particle having a porous shape with a resin component include a method of diluting the resin component with a solvent, and adding the porous magnetic core particle into the diluted solution. The solvent to be used here may be any solvent that can dissolve each of the resin components. In the case of the resin that is soluble in an organic solvent, such an organic solvent may be used as toluene, xylene, cellosolve butyl acetate, methyl ethyl ketone, methyl isobutyl ketone and methanol. In addition, in the case where the resin component is water soluble or the resin component is an emulsion type, water may be used. Examples of a method for adding the resin component that is diluted by a solvent to the inside of the porous magnetic core particle include a method of impregnation with the resin component by an application method such as a dipping method, a spraying method, a brush coating method, a fluidized bed, and a kneading method, and then volatilizing the solvent. In the case of filling with a thermosetting resin, the solvent is volatilized, the temperature is raised to a temperature at which the resin to be used is cured, and a curing reaction is caused.

On the other hand, specific examples of the method for producing the magnetic material-dispersed type resin particle include the following methods. The magnetic material-dispersed type resin particle can be obtained by kneading, for example, a submicron magnetic material such as an iron powder, a magnetite particle or a ferrite particle so as to be dispersed in a thermoplastic resin, pulverizing the mixture to a desired carrier particle size, and subjecting the resultant material to thermal or mechanical spheroidizing treatment as needed. Alternatively, the magnetic material-dispersed type resin particle can be produced also by dispersing the above magnetic material in a monomer, and polymerizing the monomer to form a resin.

Examples of the resin in this case include a vinyl resin, a polyester resin, an epoxy resin, a phenol resin, a urea resin, a polyurethane resin, a polyimide resin, a cellulose resin, a silicone resin, an acrylic resin and a polyether resin. The resin may be a single resin, or a mixture of two or more types of resins. In particular, the phenol resin is preferable in terms of enhancing the strength of the magnetic core. The true density and the specific resistance can be adjusted by adjustment of the amount of the magnetic material. Specifically, in the case of a magnetic particle, it is preferable to add the magnetic particle in an amount of 70 to 95% by mass with respect to the carrier.

It is preferable for the magnetic core to have a volume-based 50% diameter (D50) of 20 μm or larger and 80 μm or smaller, because of allowing the coating resin to be uniformly coated thereon and moderating the density of a magnetic brush for the developer, which prevents the adhesion of the carrier and provides images of high quality.

As for the specific resistance of the magnetic core, it is preferable that a value of the specific resistance at an electric field intensity of 1000 (V/cm) be $1.0\times10^{5}$ (Ω·cm) or larger and $1.0\times10^{14}$ (Ω·cm) or smaller, because it is enabled that satisfactory developability is obtained.

The method for coating the surface of the magnetic core with the coating resin is not particularly limited, and a known method can be employed. For example, there is a so-called dipping method of volatilizing a solvent while stirring the magnetic core and a coating resin solution, and thereby coating the surface of the magnetic core with the coating resin. Specific examples include a universal mixing stirrer (manufactured by Fuji Paudal Co., Ltd.) and a Nauta mixer (manufactured by Hosokawa Micron Corporation). In addition, there is also a method of spraying a coating resin solution from a spray nozzle while forming a fluidized layer, and thereby coating the surface of the magnetic core with the coating resin. Specific examples of the apparatus include SPIRACOATER (manufactured by Okada Seiko Co., Ltd.) and SPIRAFLOW (manufactured by Freund Corporation). In addition, there is also a method of dry-coating a magnetic core with a coating resin having a form of a particle. Specific examples of the method include treatment methods with the use of apparatuses such as Hybridizer (manufactured by Nara Machinery Co., Ltd.), Mechanofusion (manufactured by Hosokawa Micron Corporation), Hiflex Gral (manufactured by Fukae Powtech), and Theta Composer (manufactured by Tokuju Corporation).

Next, the magnetic carrier will be described.

It is preferable that a strength of magnetization of the magnetic carrier be 40 ($Am^2/kg$) or higher and 70 ($Am^2/kg$) or lower, under a magnetic field of 5000/4π (kA/m). When the strength of magnetization of the magnetic carrier is within the above range, the magnetic binding force to a developing sleeve is appropriate, and accordingly the occurrence of the adhesion of the carrier can be more satisfactorily reduced. In addition, the magnetic carrier can decrease the stress to be given to the toner in the magnetic brush, and can satisfactorily suppress the deterioration of the toner and the adhesion to other members.

In addition, the strength of magnetization of the magnetic carrier can be appropriately adjusted by the amount of a resin to be contained.

It is preferable for the remanent magnetization of the magnetic carrier to be 20.0 ($Am^2/kg$) or less, and is more preferable to be 10.0 ($Am^2/kg$) or less. When the remanent magnetization of the magnetic carrier is within the above range, the developer obtains particularly satisfactory fluidity, and provides satisfactory dot reproducibility.

It is preferable for a true density of the magnetic carrier to be 2.5 ($g/cm^3$) or higher and 5.5 ($g/cm^3$) or lower, and is more preferable to be 3.0 ($g/cm^3$) or higher and 5.0 ($g/cm^3$) or lower. A two-component developer containing the magnetic carrier having the true density in this range decreases the load onto the toner and reduces the adhesion of the toner components to the magnetic carrier. In addition, in order to achieve both of the satisfactory developability at low electric-field strength and the prevention of the adhesion of the carrier, the true density in this range is preferable for the magnetic carrier.

It is preferable that the volume-based 50% diameter (D50) of the magnetic carrier be 21 μm or larger and 81 μm or smaller from the viewpoints of the charge imparting capability to the toner, reduction of the adhesion of the carrier to an image area, and enhancement of image quality. More preferably, the volume-based 50% diameter (D50) of the magnetic carrier is 25 μm or larger and 60 μm or smaller.

Next, the structure of the toner which is preferable to achieve the aspect in the present disclosure will be described in detail below.

<Binder Resin>

The toner particle in the present disclosure can employ the following polymers as a binder resin. Examples thereof include: monopolymers of styrene and its substitution products such as polystyrene, poly-p-chlorostyrene and polyvinyl toluene; styrene-based copolymers such as a styrene-p-chlorostyrene copolymer, a styrene-vinyltoluene copolymer, a styrene-vinylnaphthalene copolymer, a styrene-acrylic acid ester copolymer, and a styrene-methacrylic acid ester copolymer; hybrid resins in which a styrene-based copolymer resin, a polyester resin and a polyester resin are mixed or partially reacted with a vinyl-based resin; and polyvinyl chloride, a phenol resin, a naturally modified phenol resin, a natural resin modified maleic acid resin, an acrylic resin, a methacrylic resin, polyvinyl acetate, a silicone resin, a polyester resin, polyurethane, a polyamide resin, a furan resin, an epoxy resin, a xylene resin, a polyethylene resin and a polypropylene resin. Among them, it is preferable to use the polyester resin as a main component, from the viewpoint of low-temperature fixability.

Monomers to be used for the polyester unit of the polyester resin include: a polyhydric alcohol (dihydric or trihydric or higher alcohol); and a polycarboxylic acid (bivalent or trivalent or higher carboxylic acid), an acid anhydride thereof, or a lower alkyl ester thereof. Here, in order to prepare a branched polymer so that "strain hardening properties" can be developed, it is effective to form partial cross-links in molecules of an amorphous resin, and for this purpose, it is preferable to employ a trivalent or higher polyfunctional compound. Accordingly, it is preferable that the raw material monomer for the polyester unit include a trivalent or higher carboxylic acid, an acid anhydride thereof or a lower alkyl ester thereof, and/or a trihydric or higher alcohol.

The following polyhydric alcohol monomers can be used as the polyhydric alcohol monomers to be used for the polyester unit of polyester resins.

Examples of the dihydric alcohol component include: ethylene glycol, propylene glycol, 1,3-butanediol, 1,4-butanediol, 2,3-butanediol, diethylene glycol, triethylene glycol, 1,5-pentanediol, 1,6-hexanediol, neopentyl glycol, 2-ethyl-1,3-hexanediol, and hydrogenated bisphenol A; bisphenols represented by formula (A) and derivatives thereof;

(A)

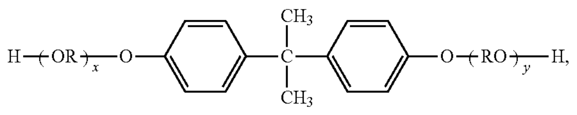

wherein R is an ethylene or propylene group, x and y are each an integer of 0 or larger, and an average value of x+y is 0 or larger and 10 or smaller; and diols represented by formula (B);

(B)

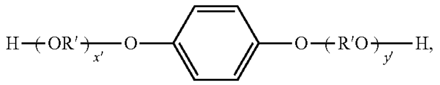

wherein R' is $—CH_2CH_2—$, $—CH_2—CH(CH_3)—$, or $—CH_2—C(CH_3)_2—$, x' and y' are each an integer of 0 or larger, and an average value of x'+y' is 0 or larger and 10 or smaller.

Examples of the trihydric or higher alcohol component include: sorbitol, 1,2,3,6-hexanetetrol, 1,4-sorbitan, pentaerythritol, dipentaerythritol, tripentaerythritol, 1,2,4-butanetriol, 1,2,5-pentanetriol, glycerol, 2-methylpropanetriol, 2-methyl-1,2,4-butanetriol, trimethylolethane, trimethylolpropane and 1,3,5-trihydroxymethyl benzene. Among the trihydric or higher alcohols, glycerol, trimethylolpropane and pentaerythritol are preferably used. These dihydric alcohols and trihydric or higher alcohols can be used alone or in combination of two or more.

The following polyvalent carboxylic acid monomers can be used as polyvalent carboxylic acid monomers for the polyester unit of the polyester resin.

Examples of the bivalent carboxylic acid component include: maleic acid, fumaric acid, citraconic acid, itaconic acid, glutaconic acid, phthalic acid, isophthalic acid, terephthalic acid, succinic acid, adipic acid, sebacic acid, azelaic acid, malonic acid, n-dodecenyl succinic acid, isododecenyl succinic acid, n-dodecyl succinic acid, isododecyl succinic acid, n-octenyl succinic acid, n-octyl succinic acid, isooctenyl succinic acid and isooctyl succinic acid; and anhydrides of these acids and lower alkyl esters thereof. Among the bivalent carboxylic acids, maleic acid, fumaric acid, terephthalic acid and n-dodecenylsuccinic acid are preferably used.

Examples of the trivalent or higher carboxylic acid, acid anhydride thereof or lower alkyl ester thereof include: 1,2,4-benzenetricarboxylic acid, 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxyl-2-methyl-2-methylenecarboxypropane, 1,2,4-cyclohexanetricarboxylic acid, tetra(methylenecarboxyl) methane, 1,2,7,8-octanetetracarboxylic acid, pyromellitic acid and enpol trimer acid; and anhydrides thereof or lower alkyl esters thereof. Among the trivalent or higher carboxylic acids and derivatives thereof, the 1,2,4-benzenetricarboxylic acid, that is, trimellitic acid or a derivative thereof is particularly preferably used, because of being inexpensive and being easy of reaction control. These bivalent carboxylic acids and trivalent or higher carboxylic acids can be used alone or in combination of two or more.

A method for producing the polyester unit of the present disclosure is not particularly limited, and a known method can be used. The polyester resin is produced, for example, by simultaneously charging the alcohol monomer and the carboxylic acid monomer described above, and polymerizing the mixture, through an esterification reaction or an ester exchange reaction, and a condensation reaction. In addition, the polymerization temperature is not particularly limited, but is preferably in a range of 180° C. or higher and 290° C. or lower. At the time of the polymerization of the polyester unit, such a polymerization catalyst can be used, for example, as a titanium-based catalyst, a tin-based catalyst, zinc acetate, antimony trioxide and germanium dioxide. In particular, the binder resin of the present disclosure is more preferably a polyester unit that is polymerized with the use of the tin-based catalyst.

In addition, an acid value of the polyester resin is 5 mgKOH/g or higher and 20 mgKOH/g or lower, and the hydroxyl value is preferably 20 mgKOH/g or higher and 70 mgKOH/g or lower from the viewpoint of fogging properties, because the polyester resin can reduce the amount of moisture to be adsorbed in a high-temperature and high-humidity environment, and a non-electrostatic adhesive force to a low level.

In addition, a mixture of a resin having a low molecular weight and a resin having a high molecular weight may be used as the binder resin. A content ratio of the resin having the high molecular weight to the resin having the low molecular weight is preferably 40/60 to 85/15 on a mass basis, from the viewpoints of low-temperature fixability and hot offset resistance.

<Release Agent>

Examples of a wax to be used for the toner of the present disclosure include the following: hydrocarbon waxes such as low molecular weight polyethylene, low molecular weight polypropylene, an alkylene copolymer, a microcrystalline wax, a paraffin wax and a Fischer-Tropsch wax; oxides of hydrocarbon waxes such as oxidized polyethylene waxes, or block copolymers thereof; waxes mainly containing fatty acid esters, such as carnauba wax; and waxes in which a part or the whole of a fatty acid ester is deoxidized, such as a deoxidized carnauba wax. The examples further include the following: saturated straight chain fatty acids such as palmitic acid, stearic acid and montanic acid; unsaturated fatty acids such as brassidic acid, eleostearic acid and parinaric acid; saturated alcohols such as a stearyl alcohol, an aralkyl alcohol, a behenyl alcohol, a carnaubyl alcohol, a ceryl alcohol and a melissyl alcohol; polyhydric alcohols such as sorbitol; esters of fatty acids such as palmitic acid, stearic acid, behenic acid and montanic acid, with alcohols such as a stearyl alcohol, an aralkyl alcohol, a behenyl alcohol, a carnaubyl alcohol, a ceryl alcohol and a melissyl alcohol; fatty acid amides such as linoleic acid amide, oleic acid amide, lauric acid amide; saturated fatty acid bisamides such as methylene bisstearic acid amide, ethylene biscapric acid amide, ethylene bislauric acid amide, and hexamethylene bisstearic acid amide; unsaturated fatty acid amides such as ethylenebisoleic acid amide, hexamethylenebisoleic acid amide, N,N'-dioleyl adipic acid amide, and N,N'-dioleyl sebacic acid amide; aromatic bisamides such as m-xylene bisstearic acid amide and N,N'-distearyl isophthalic acid amide; aliphatic metal salts (generally referred to as metal soaps) such as calcium stearate, calcium laurate, zinc stearate and magnesium stearate; waxes in which an aliphatic hydrocarbon wax is grafted with a vinyl monomer such as styrene or acrylic acid; partially esterified product of fatty acids and polyhydric alcohols, such as behenic acid monoglyceride; and methyl ester compounds having hydroxyl groups, which are obtained by hydrogenation of vegetable fats and oils.

Among these waxes, hydrocarbon waxes such as a paraffin wax and a Fischer-Tropsch wax, or fatty acid ester waxes such as a carnauba wax are preferable, from the viewpoint of enhancing low-temperature fixability and fixing separableness. In the present disclosure, a hydrocarbon wax is more preferable in that the hot offset resistance further enhances.

In the present disclosure, the wax is preferably used in an amount of 3 to 8 parts by mass per 100 parts by mass of the binder resin.

In addition, in an endothermic curve at the time of temperature rise as measured by a differential scanning calorimeter (DSC), it is preferable that the peak temperature of the maximum endothermic peak of the wax be 45° C. or higher and 140° C. or lower. It is preferable that the peak temperature of the maximum endothermic peak of the wax be within the above range, because both the storage stability and the hot offset resistance of the toner can be achieved.

<Coloring Agent>

The toner particle in the present disclosure may contain a coloring agent. Examples of the coloring agent include the following agents.

Examples of a black coloring agent include: carbon black; and black toned agents obtained by mixing a yellow coloring agent, a magenta coloring agent and a cyan coloring agent. As the coloring agent, a pigment may be used alone, but it is more preferable to use a dye and a pigment in combination and enhance the sharpness, from the viewpoint of a quality of a full-color image.

Examples of pigment for a magenta toner include the following pigments: C. I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48:2, 48:3, 48:4, 49, 50, 51, 52, 53, 54, 55, 57:1, 58, 60, 63, 64, 68, 81:1, 83, 87, 88, 89, 90, 112, 114, 122, 123, 146, 147, 150, 163, 184, 202, 206, 207, 209, 238, 269 and 282; C. I. Pigment Violet 19; and C. I. Vat Red 1, 2, 10, 13, 15, 23, 29 and 35.

Examples of dye for the magenta toner include the following dyes: oil-soluble dyes such as C. I. Solvent Red 1, 3, 8, 23, 24, 25, 27, 30, 49, 81, 82, 83, 84, 100, 109 and 121, C. I. Disperse Red 9, C. I. Solvent Violet 8, 13, 14, 21 and 27, and C. I. disperse violet 1; and basic dyes such as C. I. Basic Red 1, 2, 9, 12, 13, 14, 15, 17, 18, 22, 23, 24, 27, 29, 32, 34, 35, 36, 37, 38, 39 and 40, and C. I. Basic Violet 1, 3, 7, 10, 14, 15, 21, 25, 26, 27 and 28.

Examples of pigment for a cyan toner include the following pigments: C. I. Pigment Blue 2, 3, 15:2, 15:3, 15:4, 16 and 17; C. I. Vat Blue 6; C. I. Acid Blue 45; and copper phthalocyanine pigments in which parts of phthalocyanine skeleton are substituted with 1 to 5 phthalimidomethyl groups.

Examples of dye for the cyan toner include C. I. Solvent Blue 70.

Examples of pigment for a yellow toner include the following pigments: C. I. Pigment Yellow 1, 2, 3, 4, 5, 6, 7, 10, 11, 12, 13, 14, 15, 16, 17, 23, 62, 65, 73, 74, 83, 93, 94, 95, 97, 109, 110, 111, 120, 127, 128, 129, 147, 151, 154, 155, 168, 174, 175, 176, 180, 181 and 185; and C. I. Vat Yellow 1, 3 and 20.

Examples of dye for the yellow toner include C. I. Solvent Yellow 162.

These coloring agents may be used alone or as a mixture, or may further be used in a state of a solid solution. The coloring agent is selected in terms of hue angle, chroma saturation, lightness, light resistance, OHP transparency, and dispersibility in toner.

It is preferable that a content of the coloring agent be 0.1 to 30.0 parts by mass with respect to the total amount of the resin components.

<Inorganic Particulate>

It is preferable that the toner contain an inorganic particulate mainly for the purpose of enhancing fluidity and chargeability, and that the inorganic particulate is preferably attached to the surface of the toner.

As the inorganic particulates serving as spacer particles for enhancing the releasability between the toner and the carrier, silica particles are preferable that they have a maximum peak particle size of 80 nm or larger and 200 nm or smaller on a number distribution basis. In order that the silica particles more satisfactorily suppress the detachment from the toner while functioning as the spacer particles, it is more preferable that the maximum peak particle size be 100 nm or larger and 150 nm or smaller on the number distribution basis.

In addition, in order to improve the fluidity of the toner, it is preferable that the toner contain inorganic particulates having a maximum peak particle size of 20 nm or larger and 50 nm or smaller on the number distribution basis, and it is also a preferable form to use the inorganic particulates in combination with the silica particles.

Furthermore, another external additive may be added to the toner particle, for the purpose of enhancing the fluidity and transferability. It is preferable that the external additive which is externally added to the surface of the toner particle contain an inorganic particulate such as titanium oxide, alumina oxide and silica, and it is also acceptable to use a plurality of types of external additives in combination.

It is preferable for the total content of the external additives to be 0.3 to 5.0 parts by mass, and is more preferable to be 0.8 to 4.0 parts by mass, with respect to 100 parts by mass of the toner particles. Among the external additives, the content of the silica particles is 0.1 to 2.5 parts by mass, which have the maximum peak particle size of 80 nm or larger and 200 nm or smaller on the number distribution basis, and more preferably is 0.5 to 2.0 parts by mass. When the content of the silica particles is within this range, which have the maximum peak particle size of 80 nm or larger and 200 nm or smaller on the number distribution basis, the effect as the spacer particles becomes more remarkable.

In addition, it is preferable that the surfaces of the silica particle and the inorganic particulate that are used as the external additive be subjected to hydrophobizing treatment. It is preferable that the hydrophobizing treatment be performed by a coupling agent that includes: various titanium coupling agents and silane coupling agents; a fatty acid and a metal salt thereof silicone oil; or a combination thereof.

Examples of the titanium coupling agent include the following agents: tetrabutyl titanate, tetraoctyl titanate, isopropyl triisostearoyl titanate, isopropyl tridecylbenzene sulphonyl titanate, and bis(dioctyl pyrophosphate)oxyacetate titanate.

In addition, examples of the silane coupling agent include the following chemical compounds: γ-(2-aminoethyl)aminopropyl trimethoxysilane, γ-(2-aminoethyl)aminopropylmethyl dimethoxysilane, γ-methacryloxypropyl trimethoxysilane, N-β-(N-vinylbenzylaminoethyl)γ-aminopropyl trimethoxysilane hydrochloride, hexamethyl disilazane, methyltrimethoxy silane, butyltrimethoxy silane, isobutyltrimethoxy silane, hexyltrimethoxy silane, octyltrimethoxy silane, decyltrimethoxy silane, dodecyltrimethoxy silane, phenyltrimethoxy silane, o-methylphenyltrimethoxy silane, and p-methylphenyltrimethoxy silane.

Examples of the fatty acid include the following acids: long chain fatty acids such as undecylic acid, lauric acid, tridecylic acid, dodecylic acid, myristic acid, palmitic acid, pentadecylic acid, stearic acid, heptadecylic acid, arachidic acid, montanic acid, oleic acid, linoleic acid and arachidonic acid. Examples of a metal of these fatty acid metal salts include zinc, iron, magnesium, aluminum, calcium, sodium, and lithium, for example.

Examples of the silicone oil include dimethyl silicone oil, methylphenyl silicone oil, and amino-modified silicone oil.

It is preferable that the hydrophobizing treatment be performed by adding a hydrophobizing agent to particles to be treated in an amount of 1 to 30% by mass (more preferably 3 to 7% by mass) with respect to the particles to be treated, and coating the particle to be treated with the hydrophobizing agent.

A degree of hydrophobization of the hydrophobization-treated external additive is not particularly limited, but the hydrophobization degree after the treatment is preferably 40 or higher and 98 or lower, for example. The hydrophobization degree indicates the wettability of a sample to methanol and is an index of hydrophobicity.

In the case where the toner of the present disclosure is mixed with the magnetic carrier and is used as a two-component developer, a satisfactory result is usually obtained when a mixing ratio with the carrier is 2 to 15% by mass, as the toner concentration in the developer, and is preferably 4 to 13% by mass. When the toner concentration is lower than 2% by mass, the image density tends to easily decrease, and when the toner concentration exceeds 15% by mass, fogging and scattering in the apparatus tend to easily occur.

In addition, in a replenishment developer for replenishing the developing device according to a decrease in the toner concentration of the two-component developer in the developing device, the amount of the toner is 2 parts by mass or more and 50 parts by mass or less with respect to 1 part by mass of the magnetic carrier for replenishment.

Next, an image forming apparatus equipped with a developing apparatus that uses a magnetic carrier, two-component developer and replenishment developer according to the present disclosure will be described with reference to examples, but the developing apparatus to be used in the developing method of the present disclosure is not limited to this.

<Measurement of Specific Resistance of Magnetic Carrier>

Figure 4A:
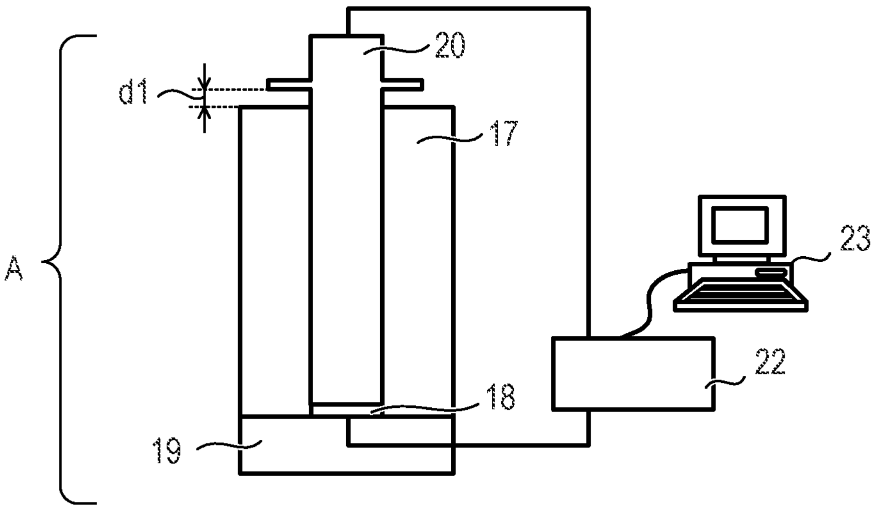
FIG. 4A is a schematic view of an apparatus for measuring the specific resistance of a magnetic carrier and a porous magnetic core.
Figure 4B:
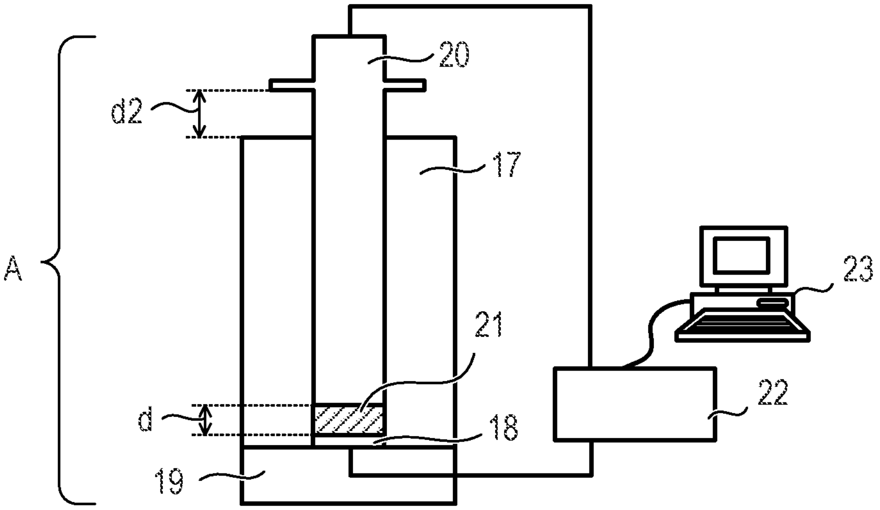
FIG. 4B is a schematic view of an apparatus for measuring the specific resistance of the magnetic carrier and the porous magnetic core.

The specific resistances of the magnetic carrier and the porous magnetic core are measured with the use of the measuring apparatus outlined in FIGS. 4A and 4B. For information, the specific resistance of the magnetic carrier is measured at an electric field strength of 2000 (V/cm).

The resistance measuring cell A is structured of a cylindrical container (made of PTFE resin) 17 having a hole having a cross-sectional area of 2.4 $cm^2$, a lower electrode (made of stainless steel) 18, a support pedestal (made of PTFE resin) 19, and an upper electrode (made of stainless steel) 20. The cylindrical container 17 is placed on the support pedestal 19, and a sample (magnetic carrier or porous magnetic core) 21 is charged therein so that the thickness becomes approximately 1 mm; and the upper electrode 20 is placed on the charged sample 21, and the thickness of the sample is measured. As is illustrated in FIG. 4A, d1 represents a gap at the time when there is no sample, and as illustrated in FIG. 4B, d2 represents a gap at the time when the sample is charged so that the thickness becomes approximately 1 mm; and then the thickness d of the sample is calculated by the following expression:

$$d=d2-d1\ (\text{mm}).$$

At this time, a mass of the sample is appropriately changed so that the thickness d of the sample becomes 0.95 mm or more and 1.04 mm or less.

The specific resistance of the sample can be determined by applying a direct-current voltage between the electrodes and measuring an electric current flowing at this time. For the measurement, an electrometer 22 (Keithley 6517A, manufactured by Keithley Instruments&Products) and a processing computer 23 for control are used.

For the processing computer for the control, a control system and a control software (LabVEIW manufactured by National Instruments Corp.) which were manufactured by National Instruments were used.

As the measurement conditions, a contact area S between the sample and the electrode, which has been 2.4 $cm^2$, and a value d which has been measured so that the thickness of the sample becomes 0.95 mm or more and 1.04 mm or less are input. In addition, a load of the upper electrode is determined to be 270 g, and a maximum application voltage is determined to be 1000 V.

$$\text{Specific resistance }(\Omega\cdot\text{cm})=(\text{applied voltage (V)/measured current (A)})\times S\ (\text{cm}^2)/d\ (\text{cm})$$

$$\text{Electric field strength (V/cm)}=\text{applied voltage (V)}/d\ (\text{cm})$$

As for the specific resistances of the magnetic carrier and the porous magnetic core at the electric field strength are read from the graph, by reading the specific resistance at the electric field strength on the graph.

<Method for Measuring Volume-Based 50% Diameters (D50) of Magnetic Carrier and Porous Magnetic Core>

The particle size distribution was measured with a laser diffraction/scattering type of particle size distribution measuring apparatus "Microtrac MT3300EX" (manufactured by Nikkiso Co., Ltd.).

The volume-based 50% diameters (D50) of the magnetic carrier and the porous magnetic core were measured with the particle size distribution measuring apparatus mounted with a sample feeder "One Shot Dry Type Sample Conditioner Turbotrac" (manufactured by Nikkiso Co., Ltd.) for dry type measurement. As for the supply conditions in Turbotrac, a dust collector was used as a vacuum source in which the air quantity was set at approximately 33 l/sec and the pressure was set at approximately 17 kPa. The control is performed automatically on software. As the particle size, the 50% particle diameter (D50) which is a cumulative value of the volumetric distribution is determined. The control and the analysis are performed with the use of the attached software (version 10.3.3-202D). The measurement conditions are as follows.

SetZero time: 10 seconds
Measurement time period: 10 seconds
Number of measurements: one time
Refractive index of particle: 1.81%
Particle shape: non-spherical
Upper limit of measurement: 1408 μm
Lower limit of measurement: 0.243 μm
Measurement environment: 23° C., 50% RH <Measurement of Pore Size and Pore Volume of Porous Magnetic Core>

The pore size distribution of the porous magnetic core is measured by a mercury press-in method.

The measurement principle is as follows.

In the present measurement, the pressure applied to mercury is varied, and the amount of mercury is measured that has intruded into the pores at that time. The condition under which mercury can intrude into the pores can be expressed by $PD=-4\sigma \cos\theta$ from the balance of power, assuming that the pressure, the pore diameter, the contact angle and surface tension of mercury are represented by P, D, θ and σ, respectively. When the contact angle and the surface tension are determined to be constants, the pressure P results in being inversely proportional to the pore diameter D into which mercury can intrude at that time. For this reason, the pore distribution is determined by measuring the pressure P and the amount V of the intruding liquid at that time while varying the pressure to obtain a P-V curve, and directly replacing the horizontal axis P of the curve with the pore diameter in this expression.

The pore size distribution can be measured by using a fully automatic multifunctional mercury porosimeter PoreMaster series or PoreMaster-GT series manufactured by Yuasa IONICS, an automatic porosimeter AutoPore IV9500 series manufactured by Shimadzu Corporation, or the like, as a measuring apparatus.

Specifically, the pore size distribution was measured with the use of AutoPore IV9520 manufactured by Shimadzu Corporation Co., Ltd., under the following conditions and procedures.

| Measurement conditions | |
|---|---|
| Measurement environment | 20° C. |
| Measurement cell | sample volume 5 $cm^3$, press-in volume 1.1 $cm^3$, application for powder |
| Measurement range | 2.0 psia (13.8 kPa) or higher and 59989.6 psia (413.7 kPa) or lower |
| Measurement step (Steps are formed so as to form equal intervals when the pore size is taken in logarithm.) | 80 steps |
| Press-in parameter exhaust pressure | 50 μm Hg |
| Exhaust time period | 5.0 min |
| Mercury injection pressure | 2.0 psia (13.8 kPa) |
| Equilibrium time | 5 secs |
| High pressure parameter equilibrium time | 5 secs |
| Mercury parameter advancing contact angle | 130.0 degrees |
| Receding contact angle | 130.0 degrees |
| Surface tension | 485.0 mN/m (485.0 dynes/cm) |
| Mercury density | 13.5335 g/mL |

-continued

Measurement Procedure (1) Approximately 1.0 g of the porous magnetic core is weighed, and is charged into a sample cell.

The weighed value is input.

(2) A range of 2.0 psia (13.8 kPa) or higher and 45.8 psia (315.6 kPa) or lower is measured in a low-pressure section.

(3) A range of 45.9 psia (316.3 kPa) or higher and 59989.6 psia (413.6 MPa) or lower is measured in a high-pressure section.

(4) The pore size distribution is calculated from a mercury injection pressure and a mercury injection volume.

Procedures (2), (3) and (4) were automatically performed by software attached to the apparatus.

The pore size at which a differential pore volume becomes local maximum is determined by reading a pore size at which the differential pore volume becomes the maximum in a range of pore sizes of 0.1 μm or larger and 3.0 μm or smaller, from the pore size distribution measured as in the above way, and adopting the pore size.

In addition, a pore volume obtained by integrating the differential pore volumes in a range of pore sizes of 0.1 μm or larger and 3.0 μm or smaller was calculated with the use of attached software.

<Method for Measuring Weight Average Particle Size (D4) and Number Average Particle Size (D1)>

The weight average particle size (D4) and the number average particle size (D1) of the toner were measured with the use of a precision particle size distribution measuring apparatus "Coulter Counter Multisizer 3" (registered trademark, manufactured by Beckman Coulter, Inc.) equipped with an aperture tube of 100 μm, according to a pore electric resistance method, and a dedicated software "Beckman Coulter Multisizer 3 Version 3.51" (manufactured by Beckman Coulter, Inc.), which is attached for setting the measurement conditions and analyzing the measurement data. The particle sizes were measured through 25000 channels which were the number of effective measurement channels, and were calculated after the analysis of the measurement data.

As an electrolytic aqueous solution to be used for the measurement, a solution prepared by dissolving guaranteed grade sodium chloride in ion-exchanged water so as to have a concentration of approximately 1% by mass, for example, "ISOTON II" (produced by Beckman Coulter, Inc.) can be used.

For information, the dedicated software was set in the following way, before the measurement and analysis are performed.

In the "screen of changing standard operation method (SOM)" in the dedicated software, the total count number in the control mode is set to 50000 particles, the number of measurements is set to 1, and the Kd value is set to a value obtained with the use of "Standard particle 10.0 μm" (produced by Beckman Coulter, Inc.). The threshold and the noise level are automatically set by pressing a measurement button of threshold/noise level. In addition, the current is set to 1600 μA, the gain is set to 2, the electrolytic solution is set to ISOTON II, and the flush of the aperture tube after measurement is set checked.

In "setting screen for conversion from pulse to particle size" of the dedicated software, a bin interval is set to a logarithmic particle size, a particle size bin is set to 256 particle size bin, and a particle size range is set to a value from 2 μm to 60 μm.

A specific measurement method is as follows.

(1) Approximately 200 ml of the electrolytic aqueous solution is charged into a 250 ml round-bottomed beaker made from glass, which is dedicated to Multisizer 3, the beaker is set on a sample stand, and a stirrer rod is rotated counterclockwise at 24 rotation/second to stir the solution. Then, dirt and air bubbles in the aperture tube are removed, by the "aperture flush" function of the analysis software.

(2) The electrolytic aqueous solution in an amount of approximately 30 ml is charged into a 100 ml flat-bottomed beaker made from glass. Into the aqueous solution, approximately 0.3 ml of a diluted solution is added that is obtained by diluting "Contaminon N" (aqueous solution of 10% by mass of neutral detergent for cleaning precision measuring devices, which is formed of a nonionic surface-active agent, an anionic surface-active agent and an organic builder, and has a pH of 7; and produced by Wako Pure Chemical Industries, Ltd.) of a dispersing agent, to 3 times by mass with ion-exchanged water.

(3) A predetermined amount of ion-exchanged water is charged into a water tank of an ultrasonic dispersion device "Ultrasonic Dispersion System Tetora 150" (manufactured by Nikkaki Bios Co., Ltd.) which houses two oscillators having an oscillation frequency of 50 kHz in a state in which the phases are shifted by 180 degrees, and has an electrical output of 120 W. Into the water tank, approximately 2 ml of the Contaminon N is added.

(4) The beaker of the (2) is set in a beaker fixing hole of the ultrasonic dispersion device, and the ultrasonic dispersion device is operated. Then, a height position of the beaker is adjusted so that a resonance state of the liquid surface of the electrolytic aqueous solution in the beaker becomes maximum.

(5) In a state in which the electrolytic aqueous solution in the beaker of the (4) is irradiated with ultrasonic waves, approximately 10 mg of the toner is added little by little into the electrolytic aqueous solution, and is dispersed therein. Then, the ultrasonic dispersion treatment is continued further for 60 seconds. For information, in the ultrasonic dispersion, a water temperature in the water tank is appropriately adjusted to 10° C. or higher and 40° C. or lower.

(6) The aqueous solution of the electrolyte in the (5), in which the toner has been dispersed, is added dropwise into the round bottom beaker of the (1) with the use of a pipet, which has been placed in the sample stand, and the measurement concentration is adjusted so as to become approximately 5%. Then, the measurement is performed until the number of particles to be measured reaches 50000.

(7) The measurement data is analyzed by the dedicated software attached to the apparatus, and the weight average particle size (D4) and the number average particle size (D1) are calculated. For information, the "average size" on a screen of analysis/volume statistics (arithmetic mean) at the time when graph/volume % has been set in the dedicated software is the weight average particle size (D4), and the "average size" on a screen of analysis/number statistics (arithmetic mean) at the time when the graph/number % has been set in the dedicated software is the number average particle size (D1).

<Method for Calculating Amount of Fine Powder>

The amount of fine powder on a number basis (number %) in the toner is calculated in the following way.

For example, after the measurement has been performed with Multisizer 3, the number % of particles having a size of 4.0 μm or smaller in the toner is determined by procedures of: (1) setting the screen to graph/number % in dedicated software and allowing a chart of the measurement result to be displayed by number %; (2) checking "<" in a particle size setting portion on a screen of format/particle size/particle size statistics, and inputting "4" in a particle size input portion below the particle size setting portion; and (3) reading the numerical value in the display portion of the "<4 μm" at the time when a screen of analytical/number statistics (arithmetic mean) has been displayed, and adopting the value as the number % of particles of 4.0 μm or smaller in the toner.

<Method for Calculating Amount of Coarse Grain>

The amount of coarse grain on a volume basis (volume %) in the toner is calculated in the following way.

For example, after the measurement has been performed with Multisizer 3, the volume % of particles having a size of 10.0 μm or larger in the toner is determined by procedures of: (1) setting the screen to graph/volume % in dedicated software and allowing a chart of the measurement result to be displayed by volume %; (2) checking ">" in the particle size setting portion on the screen of the format/particle size/particle size statistics, and inputting "10" in the particle size input portion below the particle size setting portion; and (3) displaying a screen of analytical/volume statistics (arithmetic mean), reading the numerical value of the ">10 μm" in the display portion at this time, and adopting the value as the volume % of particles of 10.0 μm or larger in the toner.

<X-Ray Diffraction Analysis of Powder>

An XRD pattern was measured with the use of an X-ray diffraction analyzing apparatus (X'pert PRO-MPD: manufactured by PANalytical).

X-rays were generated at an acceleration voltage of 45 kV and an electric current of 40 mA.

The X-ray for the powder was measured in the following measurement conditions.

Divergence slit: ¼ rad (fixed)
Anti-scattering slit: ½ rad
Soller slit: 0.04 rad
Mask: 15 mm
Antiscatter slit: 7.5 mm
Spinner: present
Measurement method Scan axis: Continuous 2θ/θ
Measurement range: $5.0° \leq 2\theta \leq 80°$
Step interval: 0.026 deg/s
Scan speed: 0.525 deg/s For information, as a sample to be used for measurement of P70, a particle is used in which a strength of magnetization at the time when an external magnetic field of 5000/4π (kA/m) is applied is adjusted so as to become 70 $Am^2/kg$, by using the same formulation as that of the porous-ferrite core material, and changing a concentration of oxygen in a baking process at the time of production.

<Method for Measuring Strength of Magnetization of Magnetic Core>

The strength of magnetization of the magnetic core can be determined by a vibrating magnetic field type magnetic characteristic measuring apparatus (Vibrating sample magnetometer) or a direct-current magnetization characteristic recording apparatus (B-H tracer). In Examples which will be described later, the strength of magnetization is measured with the vibrating magnetic field type magnetic characteristic measuring apparatus BHV-30 (manufactured by Riken Denshi Co., Ltd.), according to the following procedure.

Magnetic cores that have sufficiently densely filled a cylindrical plastic container shall be used as a sample. An actual mass of the sample is measured that fills the container. After that, the sample in the plastic container is bonded by an instant adhesive so that the sample does not move.

The external magnetic field axis and the magnetization moment axis at 5000/4π (kA/m) are calibrated with the use of a standard sample.

The strength of magnetization was measured from a loop of magnetization moment, which was obtained when an external magnetic field of 5000/4π (kA/m) was applied to the sample at a sweep speed of 5 (min loop). The strength of magnetization ($Am^2/kg$) of the magnetic core is obtained by dividing the value obtained through these procedures, by the weight of the sample.

<Method for Producing Toner>

A method for producing the toner particle is not particularly limited, but is preferably a pulverization method from the viewpoint of dispersion of a release agent or a polymer in which a styrene-acrylic polymer is graft polymerized to a polyolefin. This reason is because when the toner particle is produced in an aqueous medium, the release agent having high hydrophobicity or the polymer tends to be easily localized inside the toner particle, in which the styrene-acrylic polymer is graft polymerized to the polyolefin; and because as a result, the toner particle resists forming a core-shell structure by the above described heat treatment apparatus.

A procedure for producing the toner by the pulverization method will be described below.

In a step of mixing raw materials, predetermined amounts of materials constituting the toner particle are weighed, blended and mixed, which are, for example, a binder resin, a release agent, a coloring agent, a crystalline polyester, and other components such as a charge control agent as needed. Examples of a mixing apparatus include: a double-cone mixer, a V-type mixer, a drum-type mixer, a super mixer, a Henschel mixer, a Nauta mixer, and a Mechano-Hybrid (manufactured by Nippon Coke & Engineering Co., Ltd.).

Next, the mixed materials are melt-kneaded, and wax and the like are dispersed in the binder resin. In the melt-kneading step, a batch-type kneading machine such as a pressure kneader and a Banbury mixer, and a continuous kneading machine can be used; and a single-screw or a double-screw extruder is mainly used because of its superiority in capability of continuous production. Examples of the apparatuses include: a KTK type twin-screw extruder (manufactured by Kobe Steel, Ltd.); a TEM type twin-screw extruder (manufactured by Toshiba Machine Co., Ltd.); a PCM kneader (manufactured by Ikegai Corp.); a twin-screw extruder (manufactured by K.G.K. Co., Ltd.); a Co-kneader (manufactured by Buss Inc.); and Kneadex (manufactured by Nippon Coke & Engineering Co., Ltd.). Furthermore, the resin composition which is obtained by melt kneading may be rolled with a two-roll mill or the like, and be cooled with water or the like in a cooling step.

Next, the cooled product of the resin composition is pulverized to a desired particle size in a pulverization step. In the pulverization step, the cooled product is coarsely pulverized by a pulverizer, for example, such as a crusher, a hammer mill or a feather mill, and after that, the resultant product is further finely pulverized by, for example, a Kryptron System (manufactured by Kawasaki Heavy Industries, Ltd.), a Super Rotor (manufactured by Nisshin Engineering Inc.), a Turbo Mill (manufactured by Turbo Kogyo Co., Ltd.), or an air-jet type fine pulverizer.

After that, if necessary, the resultant product is classified with the use of a classifier or a sieving machine such as an inertial classification type Elbow Jet (manufactured by Nittetsu Mining Co., Ltd.), a centrifugal classification type Turboplex (manufactured by Hosokawa Micron Corporation), a TSP separator (manufactured by Hosokawa Micron Corporation), or a Faculty (manufactured by Hosokawa Micron Corporation).

After that, the toner particle is subjected to surface treatment by heating, and the circularity of the toner is increased. For example, the toner particle can be subjected to surface treatment by hot air, with the use of a surface treatment apparatus illustrated in FIG. 1.

The mixture quantitatively supplied by the raw material quantitative supply unit 101 is guided to the introduction pipe 103 installed on a vertical line of the raw material supply unit, by a compressed gas adjusted by the compressed gas adjusting unit 102. The mixture that has passed through the introduction pipe is uniformly dispersed by a conical protruding member 104 that is provided in a central part of the raw material supply unit, and is guided to a treatment chamber 106 in which the mixture is heat-treated, by being guided by supply pipes 105 which radially expand in eight directions.

At this time, the flow of the mixture that has been supplied to the treatment chamber is regulated by a regulating unit 109 for regulating the flow of the mixture, which is provided in the treatment chamber. Because of this, the mixture supplied to the treatment chamber is heat-treated while swirling in the treatment chamber, and is then cooled.

Hot air for heat-treating the supplied mixture is supplied from a hot air supply unit 107, and the hot air is spirally swirled by a swirling member 113 for swirling the hot air, and is introduced into the treatment chamber. As for a structure thereof, the swirling member 113 for swirling the hot air has a plurality of blades, and the swirling of the hot air can be controlled by the number and angle of the blades. It is preferable that a temperature of the hot air to be supplied into the treatment chamber be 100° C. to 300° C. at an outlet portion of the hot air supply unit 107. When the temperature at the outlet portion of the hot air supply unit is within the above range, the hot air can uniformly spheroidize the toner particles while preventing fusion and coalescence of the toner particles due to excessive heating of the mixture.

Furthermore, the heat-treated toner particles are cooled by cold air that is supplied from the cold air supply unit 108-1, 108-2 and 108-3; and it is preferable that the temperatures of the cold air to be supplied from the cold air supply unit 108-1, 108-2 and 108-3 be each −20° C. to 30° C. When the temperature of the cold air is within the above range, the cold air can efficiently cool the heat-treated toner particles, and can prevent the fusion and the coalescence of the heat-treated toner particles, without hindering uniform spheroidizing treatment of the mixture. It is preferable that the absolute moisture content of the cold air be 0.5 $g/m^3$ or more and 15.0 $g/m^3$ or less.

Next, the cooled heat-treated toner particles are collected by a collection unit 110 present at a lower end of the treatment chamber. For information, at the front-end of the collection unit, a blower (unillustrated) is provided which is structured to suck and transport the toner particles.

In addition, the powder particle supply port 114 is provided so that a swirling direction of the supplied mixture and the swirling direction of the hot air become the same direction, and the collection unit 110 of the surface treatment apparatus is provided on the outer peripheral portion of the treatment chamber so as to maintain the swirling direction of the swirled powder particles. Furthermore, the cold air supply unit 8 is structured so that the cold air to be supplied therefrom is supplied in a horizontal and tangential direction from the outer peripheral portion of the apparatus, to the inner peripheral surface of the treatment chamber. The swirling direction of the toner to be supplied from the powder supply port, the swirling direction of the cold air to be supplied from the cold air supply unit, and the swirling direction of the hot air to be supplied from the hot air supply unit are all the same direction. Because of this, a turbulent flow does not occur in the treatment chamber, a swirling flow in the apparatus is strengthened, a strong centrifugal force is applied to the toner, and dispersibility of the toner is further enhanced, and accordingly, the toner can be obtained in which coalescing particles are few and the shapes are uniform.

It is preferable that an average circularity of the toner be 0.960 or larger and 0.980 or smaller, from the viewpoint of fogging properties, because then the toner can reduce the non-electrostatic adhesive force to be low.

After that, the toner particles are divided into two parts of a fine powder side and a coarse grain side. The toner particles are divided into two parts, with the use of, for example, an inertial classification type Elbow Jet (manufactured by Nittetsu Mining Co., Ltd.). A desired amount of silica particulates A is externally added to each of the surfaces of the two divided heat-treated toner particles. Examples of a method for external addition treatment include a method of stirring and mixing the toner particles, by using a mixing apparatus such as a double cone mixer, a V-type mixer, a drum type mixer, a super mixer, a Henschel mixer, a Nauta mixer, a Mechano-Hybrid (Nippon Coke & Engineering Co., Ltd.), and a Nobilta (Hosokawa Micron Corporation), as an external adding machine. At this time, it is acceptable to use an external additive other than the silica particulates, such as a fluidizing agent for the external addition treatment, as needed.

Methods for measuring various physical properties of the toner and raw materials will be described below.

EXAMPLES

<Production Example of Porous Magnetic Core Particle>

Step 1 (Weighing and Mixing Step)

| | |
|---|---|
| $Fe_2O_3$ | 61.7% by mass |
| $MnCO_3$ | 34.2% by mass |
| $Mg(OH)_2$ | 3.0% by mass |
| $SrCO_3$ | 1.1% by mass |

The ferrite raw materials were weighed so as to satisfy the above masses.

After that, the mixture was pulverized and mixed by a dry type ball mill that uses balls (410 mm) of zirconia, for 2 hours.

Step 2 (Pre-Baking Step)

After pulverization and mixing, the mixture was baked at 950° C. for 2 hours in the atmosphere with the use of a burner-type baking furnace, and pre-baked ferrite was produced. The composition of the ferrite is as follows.

$$(MnO)a(MgO)b(SrO)c(Fe_2O_3)d$$

In the above formula, subscripts are a=0.40, b=0.07, c=0.01 and d=0.52.

Step 3 (Pulverization Step)

The produced pre-baked ferrite was pulverized to about 0.5 mm with a crusher, then 30 parts by mass of water was added to 100 parts by mass of the pre-baked ferrite, and the mixture was pulverized in a wet type ball mill which used balls (ϕ1.0 mm) of zirconia, for 2 hours. After the balls were separated, the resultant mixture was pulverized in a wet type bead mill which used beads (ϕ1.0 mm) of zirconia, for 3 hours, and a ferrite slurry was obtained.

Step 4 (Granulation Step)

To the ferrite slurry, 2.0 parts by mass of polyvinyl alcohol was added with respect to 100 parts by mass of the pre-baked ferrite, as a binder, and the mixture was granulated into spherical particles of 40 μm with a spray dryer (manufacturer: Ohkawara Kakohki Co., Ltd.).

Step 5 (Main Baking Step)

The spherical particles were baked at 1150° C. for 4 hours in an electric furnace under a nitrogen atmosphere (oxygen concentration: 1.0 vol %) so that the baking atmosphere is controlled.

Step 6 (Sorting Step)

The agglomerated particles were pulverized, then the resultant particles were sieved with a sieve having an opening of 250 μm, thus coarse particles were removed, and porous magnetic core particles were obtained. This is referred to as a magnetic core 1. Physical properties of the obtained magnetic core 1 are shown in Table 1.

Step 7 (Resin Filling Step)

Into a stirring container of a mixing stirrer (universal stirrer NDMV type manufactured by Dalton Corporation), 100.0 parts by mass of the magnetic core 1 was charged, while the temperature was maintained at 60° C. and while the pressure was being reduced to 2.3 kPa, nitrogen was introduced, a silicone resin solution was added dropwise to the magnetic core 1 under reduced pressure so that the resin component became 7.5 parts by mass, and after the completion of the dropwise addition, stirring was continued in the state for 2 hours. After that, the temperature was raised to 70° C., thereby the solvent was removed under reduced pressure, and the particles of the magnetic core 1 were filled with a silicone resin composition that was obtained from the silicone resin solution. After cooling, the obtained filled magnetic core particles were transferred to a mixer that had a spiral blade in a rotatable mixing container (drum mixer UD-AT type manufactured by Sugiyama Heavy Industrial Co., Ltd.) and were heated there to 220° C. at a heating rate of 2 (° C./min) under a nitrogen atmosphere and atmospheric pressure. The resultant magnetic core particles were heated and stirred at this temperature for 60 minutes, and the resin was cured. After the heat treatment, low-magnetic-force core particles were separated by magnetic separation, the resultant core particles were classified with a sieve having an opening of 150 μm, and a magnetic core 2 was obtained. Physical properties of the obtained magnetic core 2 are shown in Table 1.

<Production Example of Ferrite Core Particle>

Step 1 (Weighing and Mixing Step)

| | |
|---|---|
| $Fe_2O_3$ | 61.7% by mass |
| $MnCO_3$ | 34.2% by mass |
| $Mg(OH)_2$ | 3.0% by mass |
| $SrCO_3$ | 1.1% by mass |

The above ferrite raw materials were weighed so as to satisfy the above masses.

After that, the mixture was pulverized and mixed by a dry type ball mill that uses balls (410 mm) of zirconia, for 2 hours.

Step 2 (Pre-Baking Step)

After pulverization and mixing, the mixture was baked at 1000° C. for 2 hours in the atmosphere with the use of a burner-type baking furnace, and pre-baked ferrite was produced. The composition of the ferrite is as follows.

$$(MnO)a(MgO)b(SrO)c(Fe_2O_3)d$$

In the above formula, subscripts are a=0.40, b=0.07, c=0.01 and d=0.52.

Step 3 (Pulverization Step)

The produced pre-baked ferrite was pulverized to about 0.5 mm with a crusher, then 30 parts by mass of water was added to 100 parts by mass of the pre-baked ferrite, and the mixture was pulverized in a wet type ball mill which used balls ϕ1.0 mm) of stainless steel, for 2 hours. After the balls were separated, the resultant mixture was pulverized in a wet type bead mill which used balls (ϕ1.0 mm) of stainless steel, for 3 hours, and a ferrite slurry was obtained.

Step 4 (Granulation Step)

To the ferrite slurry, 2.0 parts by mass of polyvinyl alcohol was added with respect to 100 parts by mass of the pre-baked ferrite, as a binder, and the mixture was granulated into spherical particles of 45 μm with a spray dryer (manufacturer: Ohkawara Kakohki Co., Ltd.).

| | |
|---|---|
| Phenol | 10 parts by mass |
| Formaldehyde solution (aqueous solution of 37% by mass formaldehyde) | 16 parts by mass |
| Above surface-treated magnetite particulates | 84 parts by mass |

The above materials were introduced into a reaction vessel, and were mixed satisfactorily at a temperature of 40° C.

After that, the mixture was heated to a temperature of 85° C. at an average heating rate of 3 (° C./min) while being stirred, and 4 parts by mass of 28% by mass ammonia water and 25 parts by mass of water were added to the reaction vessel. The resultant mixture was kept at a temperature of 85° C., and was subjected to a polymerization reaction for 3 hours to be cured. At this time, a peripheral speed of the stirring blade was 1.8 (m/sec).

After the polymerization reaction, the resultant mixture was cooled to a temperature of 30° C., and water was added thereto. The supernatant liquid was removed, and the obtained precipitate was washed with water and was further air-dried. The obtained air-dried product was dried at a temperature of 60° C. under reduced pressure (5 hPa or lower), and the magnetic material-dispersed type resin core particles were obtained. This is referred to as a magnetic core 4.

Physical properties of the obtained magnetic core 4 are shown in Table 1.

TABLE 1

| Magnetic core | Volume-based 50% diameter (D50) (μm) | Apparent density ($g/cm^3$) | True density ($g/cm^3$) | Specific resistance at electric field strength of 1000 V/cm (Ω · cm) | Saturation magnetization ($Am^2/kg$) |
|---|---|---|---|---|---|
| 1 | 38 | 1.70 | 4.88 | $4.0 \times 10^7$ | 62 |
| 2 | 40 | 1.85 | 3.95 | $4.4 \times 10^7$ | 60 |
| 3 | 46 | 2.35 | 4.90 | $3.6 \times 10^7$ | 69 |
| 4 | 35 | 1.90 | 3.53 | $7.3 \times 10^{10}$ | 49 |

Step 5 (Main Baking Step)

The spherical particles were baked at 1200° C. for 6 hours in an electric furnace under a nitrogen atmosphere (oxygen concentration: 0.6 vol %) so that the baking atmosphere is controlled.

Step 6 (Sorting Step)

The agglomerated particles were pulverized, then the resultant particles were sieved with a sieve having an opening of 250 μm, thus coarse particles were removed, and ferrite core particles were obtained. This is referred to as a magnetic core 3. Physical properties of the obtained magnetic core 3 are shown in Table 1.

<Production Example of Magnetic Material-Dispersed Type Resin Core Particle>

Magnetite particulates and a silane-based coupling agent (3-(2-aminoethylaminopropyl trimethoxysilane)(in an amount of 3.0% by mass with respect to the mass of the magnetite particulates) were introduced into a container, where the magnetite particulates had a spherical shape, a number average particle size of 250 nm, a saturation magnetization of 50 ($Am^2/kg$), a remanent magnetization of 4.2 ($Am^2/kg$), a coercive force of 4.4 (kA/m), and a specific resistance of $3.3\times10^6$ (Ω·cm) at 1000 (V/cm). Then, the mixture was mixed and stirred in the container at a high speed and at a temperature of 100° C. or higher, and thereby the magnetite particulates were surface-treated.

<Production Example of Resin A1>

A silicone-containing acrylic monomer in an amount of 95.2% by mass, which corresponded to the unit Y1 that would be shown below, and a monomer corresponding to the unit Y2 in an amount of 4.8% by mass were added to a four-neck flask having a reflux cooler, a thermometer, a nitrogen-suction tube, and a fitting-type stirring apparatus. Constitutions of the unit Y1 and the unit Y2 are shown in Table 2.

Furthermore, 100 parts by mass of toluene, 100 parts by mass of methyl ethyl ketone, and 2.0 parts by mass of azobisisovaleronitrile were added to 106 parts by mass of a mixture liquid of the above monomers. The obtained mixture was kept at 70° C. for 10 hours under a nitrogen stream, and after completion of the polymerization reaction, washing was repeated, and a resin Al solution (35% by mass of solid content) was obtained. The value of 1+m of this solution was 70, which was calculated by gel permeation chromatography (GPC).

<Production Examples of Resins A2 to A26>

Resins A2 to A26 were obtained in the same manner as in the production method of the resin A1, except that the constitutions of the unit Y1 and the unit Y2 and the values of a, b, n and 1+m were changed as shown in Table 2-1 and Table 2-2.

TABLE 2-1

| Graft resin A | Unit Y1 R$_1$ | Unit Y1 R$_2$ | Mol ratio in unit Y1 | a(g) | Unit Y2 R3 | Unit Y2 R4 | Unit Y2 R5 |
|---|---|---|---|---|---|---|---|
| A1 | Methyl group | 2-Hydroxyethyl group | 7.0 | 95.2 | Methyl group | Hydrogen | Trimethylene |
| | Methyl group | 2-Carboxyethyl group | 0.0 | | | | |
| | Methyl group | Butyl group | 39.5 | | | | |
| | Methyl group | Methyl group | 53.5 | | | | |
| A2 | Methyl group | 2-Hydroxyethyl group | 0.0 | 95.2 | Hydrogen | Hydrogen | Trimethylene |
| | Methyl group | 2-Carboxyethyl group | 7.0 | | | | |
| | Methyl group | Butyl group | 39.5 | | | | |
| | Methyl group | Methyl group | 53.5 | | | | |
| A3 | Methyl group | 2-Hydroxyethyl group | 7.0 | 95.2 | Hydrogen | Methyl group | Trimethylene |
| | Methyl group | 2-Carboxyethyl group | 0.0 | | | | |
| | Methyl group | Butyl group | 39.5 | | | | |
| | Methyl group | Methyl group | 53.5 | | | | |
| A4 | Methyl group | 2-Hydroxyethyl group | 7.0 | 95.2 | Methyl group | Hydrogen | Methylene |
| | Methyl group | 2-Carboxyethyl group | 0.0 | | | | |
| | Methyl group | Butyl group | 39.5 | | | | |
| | Methyl group | Methyl group | 53.5 | | | | |
| A5 | Methyl group | 2-Hydroxyethyl group | 7.0 | 95.2 | Methyl group | Hydrogen | Decamethylene |
| | Methyl group | 2-Carboxyethyl group | 0.0 | | | | |
| | Methyl group | Butyl group | 39.5 | | | | |
| | Methyl group | Methyl group | 53.5 | | | | |
| A6 | Methyl group | 2-Hydroxyethyl group | 0.0 | 95.2 | Methyl group | Hydrogen | Trimethylene |
| | Methyl group | 2-Carboxyethyl group | 7.0 | | | | |
| | Methyl group | Butyl group | 39.5 | | | | |
| | Methyl group | Methyl group | 53.5 | | | | |
| A7 | Methyl group | 2-Hydroxyethyl group | 7.0 | 95.2 | Methyl group | Hydrogen | Trimethylene |
| | Methyl group | 2-Carboxyethyl group | 0.0 | | | | |
| | Methyl group | Butyl group | 39.5 | | | | |
| | Methyl group | Methyl group | 53.5 | | | | |
| A8 | Methyl group | 2-Hydroxyethyl group | 7.0 | 95.2 | Methyl group | Hydrogen | Trimethylene |
| | Methyl group | 2-Carboxyethyl group | 0.0 | | | | |
| | Methyl group | Butyl group | 39.5 | | | | |
| | Methyl group | Methyl group | 53.5 | | | | |
| A9 | Methyl group | 2-Hydroxyethyl group | 3.5 | 95.2 | Methyl group | Hydrogen | Trimethylene |
| | Methyl group | 2-Carboxyethyl group | 3.5 | | | | |
| | Methyl group | Butyl group | 39.5 | | | | |
| | Methyl group | Methyl group | 53.5 | | | | |
| A10 | Methyl group | 2-Hydroxyethyl group | 0.0 | 95.2 | Methyl group | Hydrogen | Trimethylene |
| | Methyl group | 2-Carboxyethyl group | 0.0 | | | | |
| | Methyl group | Butyl group | 42.5 | | | | |
| | Methyl group | Methyl group | 57.5 | | | | |
| A11 | Methyl group | 2-Hydroxyethyl group | 7.0 | 95.2 | Methyl group | Hydrogen | Trimethylene |
| | Methyl group | 2-Carboxyethyl group | 0.0 | | | | |
| | Methyl group | Butyl group | 39.5 | | | | |
| | Methyl group | Methyl group | 53.5 | | | | |
| A12 | Methyl group | 2-Hydroxyethyl group | 7.0 | 95.2 | Methyl group | Hydrogen | Trimethylene |
| | Methyl group | 2-Carboxyethyl group | 0.0 | | | | |
| | Methyl group | Butyl group | 39.5 | | | | |
| | Methyl group | Methyl group | 53.5 | | | | |
| A13 | Methyl group | 2-Hydroxyethyl group | 7.0 | 95.2 | Methyl group | Hydrogen | Trimethylene |
| | Methyl group | 2-Carboxyethyl group | 0.0 | | | | |
| | Methyl group | Butyl group | 39.5 | | | | |
| | Methyl group | Methyl group | 53.5 | | | | |
| A14 | Methyl group | 2-Hydroxyethyl group | 7.0 | 95.2 | Methyl group | Hydrogen | Trimethylene |
| | Methyl group | 2-Carboxyethyl group | 0.0 | | | | |
| | Methyl group | Butyl group | 39.5 | | | | |
| | Methyl group | Methyl group | 53.5 | | | | |
| A15 | Methyl group | 2-Hydroxyethyl group | 7.0 | 95.2 | Methyl group | Hydrogen | Trimethylene |
| | Methyl group | 2-Carboxyethyl group | 0.0 | | | | |
| | Methyl group | Butyl group | 39.5 | | | | |
| | Methyl group | Methyl group | 53.5 | | | | |
| A16 | Methyl group | 2-Hydroxyethyl group | 7.0 | 95.2 | Methyl group | Hydrogen | Trimethylene |
| | Methyl group | 2-Carboxyethyl group | 0.0 | | | | |
| | Methyl group | Butyl group | 39.5 | | | | |
| | Methyl group | Methyl group | 53.5 | | | | |
| A17 | Methyl group | 2-Hydroxyethyl group | 7.0 | 95.2 | Methyl group | Hydrogen | Trimethylene |
| | Methyl group | 2-Carboxyethyl group | 0.0 | | | | |
| | Methyl group | Butyl group | 39.5 | | | | |
| | Methyl group | Methyl group | 53.5 | | | | |
| A18 | Methyl group | 2-Hydroxyethyl group | 7.0 | 95.2 | Methyl group | Hydrogen | Trimethylene |
| | Methyl group | 2-Carboxyethyl group | 0.0 | | | | |
| | Methyl group | Butyl group | 39.5 | | | | |
| | Methyl group | Methyl group | 53.5 | | | | |

TABLE 2-1-continued

| Graft resin A | Unit Y2 R6 | Unit Y2 R7 | b(g) | n | l + m | X(g) | (Ma + Mb)/X | Ma/Mb |
|---|---|---|---|---|---|---|---|---|
| A1 | Methyl group | Methyl group | 4.8 | 6 | 70 | 105 | 0.95 | 19.8 |
| A2 | Methyl group | Methyl group | 4.8 | 6 | 70 | 105 | 0.95 | 19.8 |
| A3 | Methyl group | Methyl group | 4.8 | 6 | 70 | 105 | 0.95 | 19.8 |
| A4 | Methyl group | Methyl group | 4.8 | 6 | 70 | 105 | 0.95 | 19.8 |
| A5 | Methyl group | Methyl group | 4.8 | 6 | 70 | 105 | 0.95 | 19.8 |
| A6 | Propyl group | Methyl group | 4.8 | 6 | 70 | 105 | 0.95 | 19.8 |
| A7 | Ethyl group | Methyl group | 4.8 | 6 | 70 | 105 | 0.95 | 19.8 |
| A8 | Propyl group | Methyl group | 4.8 | 6 | 70 | 105 | 0.95 | 19.8 |
| A9 | Butyl group | Methyl group | 4.8 | 6 | 70 | 105 | 0.95 | 19.8 |
| A10 | Methyl group | Hydroxy group | 4.8 | 6 | 70 | 105 | 0.95 | 19.8 |
| A11 | Hexyl group | Methyl group | 4.8 | 6 | 65 | 105 | 0.95 | 19.8 |
| A12 | Cyclohexyl group | Methyl group | 4.8 | 6 | 75 | 105 | 0.95 | 19.8 |
| A13 | Methyl group | Methyl group | 4.8 | 6 | 60 | 105 | 0.95 | 19.8 |
| A14 | Methyl group | Methyl group | 4.8 | 6 | 80 | 105 | 0.95 | 19.8 |
| A15 | Methyl group | Methyl group | 4.8 | 6 | 200 | 105 | 0.95 | 19.8 |
| A16 | Methyl group | Methyl group | 4.8 | 6 | 230 | 105 | 0.95 | 19.8 |
| A17 | Methyl group | Methyl group | 4.8 | 6 | 50 | 105 | 0.95 | 19.8 |
| A18 | Methyl group | Methyl group | 4.8 | 6 | 250 | 105 | 0.95 | 19.8 |

TABLE 2-2

| Graft resin A | Unit Y1 $R_1$ | Unit Y1 $R_2$ | Unit Y1 Mol ratio in unit Y1 | a(g) | Unit Y2 R3 | Unit Y2 R4 | Unit Y2 R5 |
|---|---|---|---|---|---|---|---|
| A19 | Methyl group | 2-Hydroxyethyl group | 7.0 | 95.2 | Methyl group | Hydrogen | Trimethylene |
| | Methyl group | 2-Carboxyethyl group | 0.0 | | | | |
| | Methyl group | Butyl group | 39.5 | | | | |
| | Methyl group | Methyl group | 53.5 | | | | |
| A20 | Methyl group | 2-Hydroxyethyl group | 7.0 | 95.2 | Methyl group | Hydrogen | Trimethylene |
| | Methyl group | 2-Carboxyethyl group | 0.0 | | | | |
| | Methyl group | Butyl group | 39.5 | | | | |
| | Methyl group | Methyl group | 53.5 | | | | |
| A21 | Methyl group | 2-Hydroxyethyl group | 7.0 | 95.2 | Methyl group | Hydrogen | Trimethylene |
| | Methyl group | 2-Carboxyethyl group | 0.0 | | | | |
| | Methyl group | Butyl group | 39.5 | | | | |
| | Methyl group | Methyl group | 53.5 | | | | |
| A22 | Methyl group | 2-Hydroxyethyl group | 7.0 | 50 | Methyl group | Hydrogen | Trimethylene |
| | Methyl group | 2-Carboxyethyl group | 0.0 | | | | |
| | Methyl group | Butyl group | 39.5 | | | | |
| | Methyl group | Methyl group | 53.5 | | | | |
| A23 | Methyl group | 2-Hydroxyethyl group | 7.0 | 96.6 | Methyl group | Hydrogen | Trimethylene |
| | Methyl group | 2-Carboxyethyl group | 0.0 | | | | |
| | Methyl group | Butyl group | 39.5 | | | | |
| | Methyl group | Methyl group | 53.5 | | | | |
| A24 | Methyl group | 4-Hydroxyethyl group | 7.0 | 95.2 | Methyl group | Hydrogen | Trimethylene |
| | Methyl group | 4-Carboxyethyl group | 0.0 | | | | |
| | Methyl group | Butyl group | 39.5 | | | | |
| | Methyl group | Methyl group | 53.5 | | | | |
| A25 | Methyl group | 4-Hydroxyethyl group | 7.0 | 98 | Methyl group | Hydrogen | Trimethylene |
| | Methyl group | 4-Carboxyethyl group | 0.0 | | | | |
| | Methyl group | Butyl group | 39.5 | | | | |
| | Methyl group | Methyl group | 53.5 | | | | |

TABLE 2-2-continued

| | | | | | | | |
|---|---|---|---|---|---|---|---|
| A26 | Methyl group | 4-Hydroxyethyl group | 7.0 | 33.3 | Methyl group | Hydrogen | Trimethylene |
| | Methyl group | 4-Carboxyethyl group | 0.0 | | | | |
| | Methyl group | Butyl group | 39.5 | | | | |
| | Methyl group | Methyl group | 53.5 | | | | |

| Graft | Unit Y2 | | | | | | (Ma + | |
|---|---|---|---|---|---|---|---|---|
| resin A | R6 | R7 | b(g) | n | l + m | X(g) | Mb)/X | Ma/Mb |
| A19 | Methyl group | Methyl group | 4.8 | 5 | 40 | 105 | 0.95 | 19.8 |
| A20 | Methyl group | Methyl group | 4.8 | 60 | 260 | 105 | 0.95 | 19.8 |
| A21 | Methyl group | Methyl group | 4.8 | 70 | 40 | 105 | 0.95 | 19.8 |
| A22 | Methyl group | Methyl group | 50 | 2 | 40 | 111 | 0.90 | 1.0 |
| A23 | Methyl group | Methyl group | 3.4 | 120 | 40 | 100 | 1.00 | 28.4 |
| A24 | Methyl group | Methyl group | 4.8 | 1 | 70 | 105 | 0.95 | 19.8 |
| A25 | Methyl group | Methyl group | 2 | 1 | 70 | 105 | 0.95 | 49.0 |
| A26 | Methyl group | Methyl group | 66.7 | 180 | 70 | 105 | 0.95 | 0.5 |

<Method for Producing Macromonomer>

The macromonomer to be used in the resin B can be synthesized, for example, by the following method.

Raw materials shown below were added to a four-neck flask having a reflux cooler, a thermometer, a nitrogen-suction tube, and a fitting-type stirring apparatus.

| | |
|---|---|
| Methacrylic acid chloride | 1.7% by mass |
| Polymethyl methacrylate having hydroxyl group at one end (Mw; about 5000) | 98.3% by mass |

Furthermore, 100 parts by mass of THF and 1.0 part by mass of 4-tert-butylcatechol were added to 100 parts by mass of the above monomer mixture liquid, the resultant mixture was heated and refluxed under a nitrogen stream for 5 hours; and after the reaction was completed, the resultant liquid was washed with sodium hydrogen carbonate, and then, a solution of macromonomer methacrylate was obtained.

<Method for Producing Resin B1>

Monomers shown below were added to a four-neck flask having a reflux cooler, a thermometer, a nitrogen-suction tube, and a fitting-type stirring apparatus.

| | |
|---|---|
| Cyclohexyl methacrylate | 74.5% by mass |
| Methyl methacrylate: | 0.5% by mass |
| Macromonomer methacrylate | 25% by mass |

Furthermore, 100 parts by mass of toluene, 100 parts by mass of methyl ethyl ketone, and 2.0 parts by mass of azobisisovaleronitrile were added to 106 parts by mass of the mixture liquid of the above monomers. The obtained mixture was kept at 70° C. for 10 hours under a nitrogen stream, and after the completion of the polymerization reaction, washing was repeated, and a resin B1 solution (35% by mass of solid content) was obtained. The weight average molecular weight of this solution by gel permeation chromatography (GPC) was 57,000. The SPb is 10.2.

<Method for Producing Resin B2>

Monomers shown below were added to a four-neck flask having a reflux cooler, a thermometer, a nitrogen-suction tube, and a fitting-type stirring apparatus.

| | |
|---|---|
| Cyclohexyl methacrylate | 74.5% by mass |
| Methyl methacrylate | 25.5% by mass |

Furthermore, 100 parts by mass of toluene, 100 parts by mass of methyl ethyl ketone, and 2.0 parts by mass of azobisisovaleronitrile were added to 106 parts by mass of the mixture liquid of the above monomers. The obtained mixture was kept at 70° C. for 10 hours under a nitrogen stream, and after the completion of the polymerization reaction, washing was repeated, and a resin B2 solution (35% by mass of solid content) was obtained. The weight average molecular weight of this solution by gel permeation chromatography (GPC) was 68,000. The SPb is 10.2.

<Method for Producing Resin B3>

Monomers shown below were added to a four-neck flask having a reflux cooler, a thermometer, a nitrogen-suction tube, and a fitting-type stirring apparatus.

| | |
|---|---|
| Methyl methacrylate | 75% by mass |
| Macromonomer methacrylate | 25% by mass |

Furthermore, 100 parts by mass of toluene, 100 parts by mass of methyl ethyl ketone, and 2.0 parts by mass of azobisisovaleronitrile were added to 106 parts by mass of the mixture liquid of the above monomers. The obtained mixture was kept at 70° C. for 10 hours under a nitrogen stream, and after the completion of the polymerization reaction, washing was repeated, and a resin B3 solution (35% by mass of solid content) was obtained. The weight average molecular weight of this solution by gel permeation chromatography (GPC) was 35,000. The SPb is 9.9.

<Method for Producing Resin B4>

Monomers shown below were added to a four-neck flask having a reflux cooler, a thermometer, a nitrogen-suction tube, and a fitting-type stirring apparatus.

| | |
|---|---|
| Cyclohexyl methacrylate | 30% by mass |
| Methyl methacrylate | 45% by mass |
| Macromonomer methacrylate | 25% by mass |

Furthermore, 100 parts by mass of toluene, 100 parts by mass of methyl ethyl ketone, and 2.0 parts by mass of azobisisovaleronitrile were added to 106 parts by mass of the mixture liquid of the above monomers. The obtained mixture was kept at 70° C. for 10 hours under a nitrogen stream, and after completion of the polymerization reaction, washing was repeated, and a resin B4 solution (35% by mass of solid content) was obtained. The weight average molecular weight of this solution by gel permeation chromatography (GPC) was 36,000. The SPb is 10.1.

<Method for Producing Resin B5>

Monomers shown below were added to a four-neck flask having a reflux cooler, a thermometer, a nitrogen-suction tube, and a fitting-type stirring apparatus.

| | |
|---|---|
| Hexyl methacrylate | 100% by mass |

Furthermore, 100 parts by mass of toluene, 100 parts by mass of methyl ethyl ketone, and 2.0 parts by mass of azobisisovaleronitrile were added to 106 parts by mass of a mixture liquid of the above monomers. The obtained mixture was kept at 70° C. for 10 hours under a nitrogen stream, and after the completion of the polymerization reaction, washing was repeated, and a resin B5 solution (35% by mass of solid content) was obtained. The weight average molecular weight of this solution by gel permeation chromatography (GPC) was 48,000. The SPb is 9.3.

<Method for Producing Resin B6>

Monomers shown below were added to a four-neck flask having a reflux cooler, a thermometer, a nitrogen-suction tube, and a fitting-type stirring apparatus.

| | |
|---|---|
| (2-Hydroxyethyl) methacrylate | 35.4% by mass |
| Methyl methacrylate | 64.6% by mass |

Furthermore, 100 parts by mass of toluene, 100 parts by mass of methyl ethyl ketone, and 2.0 parts by mass of azobisisovaleronitrile were added to 106 parts by mass of a mixture liquid of the above monomers. The obtained mixture was kept at 70° C. for 10 hours under a nitrogen stream, and after completion of the polymerization reaction, washing was repeated, and a resin B6 solution (35% by mass of solid content) was obtained. The weight average molecular weight of this solution by gel permeation chromatography (GPC) was 37,000. The SPb is 11.4.

<Method for Producing Resin B7>

Monomers shown below were added to a four-neck flask having a reflux cooler, a thermometer, a nitrogen-suction tube, and a fitting-type stirring apparatus.

| | |
|---|---|
| Polydimethylsiloxane (average degree of polymerization of 55) | 5.0 parts by mass |
| Methyl trichlorosilane | 25.0 parts by mass |
| Water | 40.0 parts by mass |
| Methyl isobutyl ketone | 30.0 parts by mass |

Among the above materials, water and methyl isobutyl ketone were charged into a reaction container equipped with a reflux condenser, a dropping funnel and a stirrer, and the mixture was vigorously stirred so as not to form two layers; in the state, polydimethylsiloxane was added thereto, the resultant mixture was further stirred, and the reaction container was placed in an ice bath. When the temperature of the mixture in the reaction container reached 10° C., methyl trichlorosilane was added dropwise. After the completion of the dropwise addition, the mixture was washed, the solvent was evaporated under reduced pressure, and a resin B7 was obtained. The SPb is 10.2.

<Method for Producing Resin B8>

Monomers shown below were added to a four-neck flask having a reflux cooler, a thermometer, a nitrogen-suction tube, and a fitting-type stirring apparatus.

| | |
|---|---|
| Hexyl methacrylate | 10.0% by mass |
| Norbornene | 90.0% by mass |

Furthermore, 100 parts by mass of toluene, 100 parts by mass of methyl ethyl ketone, and 2 parts by mass of bis(dibenzylideneacetone) palladium were added to 106 parts by mass of the mixture liquid of the above monomers. The obtained mixture was kept at 70° C. for 10 hours under a nitrogen stream, and after the completion of the polymerization reaction, washing was repeated, and a resin B8 solution (35% by mass of solid content) was obtained. The weight average molecular weight of this solution by gel permeation chromatography (GPC) was 37,000. The SPb is 12.0.

<Resin Coating Step>

Method for Producing a Magnetic Carrier 1

The magnetic core 1 shown in Table 1 was used; a planetary motion type mixer (Nauta Mixer VN manufactured by Hosokawa Micron Corporation) was held at a temperature of 60° C., under reduced pressure (1.5 kPa); and a resin solution containing the resin A and the resin B shown in Table 3 was charged to the mixer so that the solid content of the resin component became 2.0 parts by mass with respect to 100 parts by mass of the magnetic core. As for a method of charging, ⅓ of the amount of the resin solution was charged, and the solvent removal and coating operations were carried out for 20 minutes. Next, further ⅓ of the amount of the resin solution was charged, and the solvent removal and coating operations were carried out for 20 minutes; and still further ⅓ of the amount of the resin solution was charged, and the solvent removal and coating operations were carried out for 20 minutes.

After that, the magnetic carrier coated with a coating resin composition was transferred to a mixer that had a spiral blade in a rotatable mixing container (drum mixer UD-AT type manufactured by Sugiyama Heavy Industrial Co., Ltd.). The magnetic carrier was heated under a nitrogen atmosphere at a temperature of 120° C. for 2 hours, while the mixing container was stirred at 10 rotations per minute. A low-magnetic product was separated from the obtained magnetic carrier 1 by magnetic separation, and the remainder was passed through a sieve having an opening of 150 μm, and was then classified by an air classifier. The magnetic carrier 1 was obtained of which the 50% particle diameter (D50) based on volume distribution was 39.1 μm.

The results of surface analyses of the obtained magnetic carrier 1 are shown in Table 3.

Method for Producing Magnetic Carriers 2 to 40

Magnetic carrier 2 to 40 were obtained by changing the magnetic core, and the resin A and the resin B in the coating resin solution, to those shown in Table 3, in the method for producing the above magnetic carrier 1. The physical properties are shown in Table 3.

TABLE 3

| Magnetic carrier | Magnetic core | Resin A: Resin type | Resin A: % by mass | Resin B: Resin type | Resin B: % by mass | SP value: SPa | SP value: SPb | SP value: \|SPa − SPb\| | ESCA Si atom % |
|---|---|---|---|---|---|---|---|---|---|
| 1 | 1 | A1 | 3 | B1 | 97 | 10.0 | 10.2 | 0.2 | 3.6 |
| 2 | 2 | A2 | 3 | B1 | 97 | 9.8 | 10.2 | 0.4 | 3.6 |
| 3 | 2 | A3 | 3 | B1 | 97 | 10.0 | 10.2 | 0.2 | 3.6 |
| 4 | 2 | A4 | 3 | B1 | 97 | 10.0 | 10.2 | 0.2 | 3.6 |
| 5 | 2 | A5 | 3 | B1 | 97 | 10.0 | 10.2 | 0.2 | 3.6 |
| 6 | 2 | A6 | 3 | B1 | 97 | 9.8 | 10.2 | 0.4 | 3.6 |
| 7 | 2 | A7 | 3 | B1 | 97 | 10.0 | 10.2 | 0.2 | 3.6 |
| 8 | 2 | A8 | 3 | B1 | 97 | 10.0 | 10.2 | 0.2 | 3.6 |
| 9 | 2 | A9 | 3 | B1 | 97 | 9.9 | 10.2 | 0.3 | 3.6 |
| 10 | 2 | A10 | 3 | B1 | 97 | 9.7 | 10.2 | 0.5 | 3.6 |
| 11 | 2 | A11 | 3 | B1 | 97 | 10.0 | 10.2 | 0.2 | 3.6 |
| 12 | 2 | A12 | 3 | B1 | 97 | 10.0 | 10.2 | 0.2 | 3.6 |
| 13 | 3 | A1 | 3 | B1 | 97 | 10.0 | 10.2 | 0.2 | 3.6 |
| 14 | 4 | A1 | 3 | B1 | 97 | 10.0 | 10.2 | 0.2 | 3.6 |
| 15 | 2 | A1 | 1 | B1 | 99 | 10.0 | 10.2 | 0.2 | 3.2 |
| 16 | 2 | A1 | 20 | B1 | 80 | 10.0 | 10.2 | 0.2 | 4.1 |
| 17 | 2 | A1 | 50 | B1 | 50 | 10.0 | 10.2 | 0.2 | 5.6 |
| 18 | 2 | A1 | 3 | B2 | 97 | 10.0 | 10.2 | 0.2 | 3.9 |
| 19 | 2 | A1 | 3 | B3 | 97 | 10.0 | 9.9 | 0.1 | 3.8 |
| 20 | 2 | A1 | 3 | B4 | 97 | 10.0 | 10.1 | 0.1 | 3.9 |
| 21 | 2 | A13 | 3 | B1 | 97 | 10.0 | 10.2 | 0.2 | 3.7 |
| 22 | 2 | A14 | 3 | B1 | 97 | 10.0 | 10.2 | 0.2 | 3.6 |
| 23 | 2 | A15 | 3 | B1 | 97 | 10.0 | 10.2 | 0.2 | 3.7 |
| 24 | 2 | A16 | 3 | B1 | 97 | 10.0 | 10.2 | 0.2 | 3.7 |
| 25 | 2 | A17 | 3 | B1 | 97 | 10.0 | 10.2 | 0.2 | 3.7 |
| 26 | 2 | A18 | 3 | B1 | 97 | 10.0 | 10.2 | 0.2 | 3.4 |
| 27 | 2 | A19 | 3 | B1 | 97 | 10.0 | 10.2 | 0.2 | 3.8 |
| 28 | 2 | A20 | 3 | B1 | 97 | 10.0 | 10.2 | 0.2 | 7.5 |
| 29 | 2 | A21 | 3 | B1 | 97 | 10.0 | 10.2 | 0.2 | 8.2 |
| 30 | 2 | A22 | 3 | B1 | 97 | 10.0 | 10.2 | 0.2 | 1.0 |
| 31 | 2 | A23 | 3 | B1 | 97 | 10.0 | 10.2 | 0.2 | 15.0 |
| 32 | 2 | A1 | 3 | B5 | 97 | 10.0 | 9.3 | 0.7 | 7.2 |
| 33 | 2 | A1 | 3 | B6 | 97 | 10.0 | 11.4 | 1.4 | 8.4 |
| 34 | 2 | — | 0 | B1 | 100 | 10.0 | 10.2 | 0.2 | 0.0 |
| 35 | 2 | A1 | 100 | B1 | 0 | 10.0 | 10.2 | 0.2 | 20.8 |
| 36 | 2 | A1 | 3 | B7 | 97 | 10.0 | 9.2 | 0.8 | 23.5 |
| 37 | 2 | A2 | 3 | B8 | 97 | 9.8 | 12.0 | 2.2 | 10.2 |
| 38 | 2 | A24 | 3 | B1 | 97 | 10.0 | 10.2 | 0.2 | 21.4 |
| 39 | 2 | A25 | 3 | B1 | 97 | 10.0 | 10.2 | 0.2 | 0.9 |
| 40 | 2 | A26 | 3 | B1 | 97 | 10.0 | 10.2 | 0.2 | 12.5 |

<Production Example of Toner 1>

| | |
|---|---|
| Polyester resin | 100 parts by mass |
| Fischer-Tropsch wax (peak temperature of maximum endothermic peak of 90° C.) | 4 parts by mass |
| 3,5-di-tert-butylsalicylic acid aluminum compound (Bontron E88 manufactured by Orient Chemical Industry Co., Ltd.) | 0.3 parts by mass |
| Carbon black | 10 parts by mass |

The above materials were mixed with the use of a Henschel mixer (Model FM-75, manufactured by Nippon Coke & Engineering Co., Ltd.) at a rotation number of 1500 rpm and a rotation time of 5 min, and then, the mixture was kneaded with the use of a twin-screw kneader (Model PCM-30, manufactured by Ikegai Corporation) set at a temperature of 130° C. The obtained kneaded product was cooled, and was coarsely pulverized to 1 mm or smaller by a hammer mill, and a coarsely pulverized product was obtained. The obtained coarsely pulverized product was finely pulverized with a mechanical pulverizer (T-250, manufactured by Turbo Kogyo Co., Ltd.). Furthermore, the finely pulverized product was subjected to classification which used Faculty (F-300, manufactured by Hosokawa Micron Corporation), and toner base particle 1 was obtained. The operating conditions were set at 11000 rpm for a rotation number of the classifying rotor, and 7200 rpm for the rotation number of the dispersing rotor.

| | |
|---|---|
| Toner base particle 1 | 100 parts by mass |
| Silica particulate A (number average particle size (D1) of 120 nm) | 2.0 parts by mass |

The raw materials shown in the above formulation were mixed with the use of a Henschel mixer (FM-10C, manufactured by Nippon Coke & Engineering Co., Ltd.) at a rotation number of 1900 rpm and a rotation time of 3 min, then, the mixture was subjected to heat treatment by a surface treatment apparatus illustrated in FIG. 1, and a heat-treated toner particle 1 was obtained. The operation conditions were set as follows: feed rate=5 kg/hr, hot air temperature C=160° C., hot air flow rate=6 $m^3$/min., cold air temperature E=−5° C., cold air flow rate=4 $m^3$/min., blower air quantity=20 $m^3$/min., and injection air flow rate=1 $m^3$/min.

The obtained heat-treated toner particles 1 were adjusted so that uniform heat-treated toner particles 1 could be obtained, with the use of an inertial classification type of Elbow Jet (manufactured by Nittetsu Mining Co., Ltd.).

| | |
|---|---|
| Heat-treated toner particle 1 | 100 parts by mass |
| Silica particulate B (number average particle size (D1) of 20 nm) | 0.6 parts by mass |

The above materials were mixed with a Henschel mixer (FM-75 type, manufactured by Mitsui Miike Chemical Engineering Machinery, Co., Ltd.) at a rotation number of 1900 rpm and a rotation time of 3 min, and toner 1 was obtained.

Example 1

To 91 parts by mass of the magnetic carrier 1, 9 parts by mass of the toner 1 was added, and the mixture was shaken with a shaking machine (YS-8D type: manufactured by Yayoi Co., Ltd.), and 300 g of two-component developer 1 was prepared. An amplitude condition of the shaking machine was set at 150 rpm for 2 minutes.

On the other hand, 90 parts by mass of the toner 1 was added to 10 parts by mass of the magnetic carrier 1, and the mixture was mixed with a V-type mixer in an environment of room temperature and normal humidity of 23° C. and 50% RH, for 5 minutes, and replenishment developer 1 was obtained.

The two-component developer 1 and the replenishment developer 1 were used to be subjected to the following evaluations.

As an image forming apparatus, a modified machine of a color copying machine imageRUNNER ADVANCE C5560 was used which was manufactured by Canon Marketing Japan Inc.

The two-component developer was charged into each color developing device, and the replenishment developer containers were set in which replenishment developers of respective colors were charged; an image was formed, and was subjected to various evaluations before and after a durability test.

For the durability test, a chart of FFH output with an image ratio of 1% was used, under a printing environment of a temperature of 23° C. and a relative humidity of 5 RH % (hereinafter referred to as "N/L"). In addition, under a printing environment of a temperature of 30° C. and a relative humidity of 80 RH % (hereinafter referred to as "H/H"), a chart of FFH output with an image ratio of 40% was used. The FFH is a value in which 256 gradations are expressed in hexadecimal notation; and 00 h is the first gradation of 256 gradations (white background portion), and the FFH is the 256th gradation of the 256 gradations (solid portion).

The number of output images was changed depending on each evaluation item.

Conditions:

Paper: paper for laser beam printer CS-814 (81.4 g/m$^2$) (Canon Marketing Japan Inc.)

The modified machine was modified so that full-color images of an A4 size could be output at an image forming speed of 80 (sheets/min).

Development conditions: the modified machine was modified so that the development contrast could be adjusted to an arbitrary value, and the automatic correction by the main body did not operate. The modified machine was modified so that in the peak-to-peak voltage (Vpp) of the alternating electric field, the frequency was 2.0 kHz and the Vpp could be changed from 0.7 kV to 1.8 kV in increments of 0.1 kV. The modified machine was modified so that an image could be output in a single color for each color.

Each of the evaluation items will be shown below.

(1) Image Density

Initial durability and durability image output evaluations (A4 landscape, 40% print ratio and 50000 sheets) were performed, in a high-temperature and high-humidity environment (30° C. and 80% RH), and then a solid image (FFH) was output. The density was measured with a densitometer X-Rite404A (manufactured by X-Rite Incorporated), and the average value of 6 points was taken as the image density. The difference in image densities of the initial durability and after the durability image output was determined according to the following criteria. When the evaluation was A to C, the effect of the present disclosure was determined to have been obtained.

A: difference in density is smaller than 0.10.

B: difference in density is 0.10 or larger and smaller than 0.15.

C: difference in density is 0.15 or larger and smaller than 0.20.

D: difference in density is 0.20 or larger and smaller than 0.25.

E: difference in density is 0.25 or larger.

(2) Fogging

Initial durability and durability image output evaluations (A4 landscape, 40% print ratio and 50000 sheets) were performed, in a high-temperature and high-humidity environment (30° C. and 80% RH), and then a wholly solid white A4 image was output. Fogging was evaluated according to the following criteria, after the whiteness of a white background portion was calculated with a reflectometer (manufactured by Tokyo Denshoku Co., Ltd.), and the fogging density (%) was calculated from the difference in whiteness before and after transfer. When the evaluation was A to C, the effect of the present disclosure was determined to have been obtained.

A: smaller than 1.0%

B: 1.0% or larger and smaller than 1.5%

C: 1.5% or larger and smaller than 2.0%

D: 2.0% or larger and smaller than 2.5%

E: 2.5% or larger (3) Halftone Developability

Initial durability and durability image output evaluations (A4 landscape, 40% print ratio and 50000 sheets) were performed, in a high-temperature and high-humidity environment (30° C. and 80% RH), a halftone image (30H) was printed on one sheet of A4, and areas of 1000 dots were measured with the use of a digital microscope VHX-500 (lens; wide-range zoom lens VH-Z100, manufactured by Keyence Corporation). A number average (S) of dot areas and a standard deviation (a) of the dot areas were calculated, and the dot reproducibility index was calculated by the following expression. Then, the roughness of the halftone image was evaluated by the dot reproducibility index (I).

$$\text{Dot reproducibility index } (I)=a/S\times 100$$

As for criteria for the evaluation of the roughness, the roughness was evaluated according to the following criteria. When the evaluation was A to C, the effect of the present disclosure was determined to have been obtained.

A: I is smaller than 4.0

B: I is 4.0 or larger and smaller than 5.0.

C: I is 5.0 or larger and smaller than 6.0.

D: I is 7.0 or larger and smaller than 8.0.

E: I is 8.0 or larger.

(4) Scattering of Toner

Initial durability and durability image output evaluations (A4 landscape, 40% print ratio and 50000 sheets) were performed, in a high-temperature and high-humidity environment (30° C. and 80% RH); then, the developing device was taken out from the main body, and scattering states of the toner in the inside and outside of the developing device and the main body were visually observed; and the states were evaluated according to the following criteria. When the evaluation was A to C, the effect of the present disclosure was determined to have been obtained.

A: there is no scattering of toner.

B: there is extremely slight scattering of toner.

C: there is slight scattering of toner.

D: there is scattering of toner.

E: there is remarkable scattering of toner.

The results obtained from the above evaluations (1) to (4) are shown in Table 5.

Examples 2 to 33 and Comparative Examples 1 to 7

Two-component developers 2 to 40 and replenishment developers 2 to 40 were prepared in the same manner as in Example 1, except that the magnetic carrier 1 in Example 1 was changed to magnetic carriers 2 to 40 as shown in Table 4, respectively; and were subjected to similar evaluations (1) to (4).

The obtained results are shown in Table 5.

TABLE 4

| Example or Comparative Example | Two-component developer | Replenish-ment developer | Toner | Magnetic carrier |
|---|---|---|---|---|
| Example 1 | 1 | 1 | 1 | 1 |
| Example 2 | 2 | 2 | 1 | 2 |
| Example 3 | 3 | 3 | 1 | 3 |
| Example 4 | 4 | 4 | 1 | 4 |
| Example 5 | 5 | 5 | 1 | 5 |
| Example 6 | 6 | 6 | 1 | 6 |
| Example 1 | 7 | 7 | 1 | 7 |
| Example 8 | 8 | 8 | 1 | 8 |
| Example 9 | 9 | 9 | 1 | 9 |
| Example 10 | 10 | 10 | 1 | 10 |
| Example 11 | 11 | 11 | 1 | 11 |
| Example 12 | 12 | 12 | 1 | 12 |
| Example 13 | 13 | 13 | 1 | 13 |
| Example 14 | 14 | 14 | 1 | 14 |
| Example 15 | 15 | 15 | 1 | 15 |
| Example 16 | 16 | 16 | 1 | 16 |
| Example 17 | 17 | 17 | 1 | 17 |
| Example 18 | 18 | 18 | 1 | 18 |
| Example 19 | 19 | 19 | 1 | 19 |
| Example 20 | 20 | 20 | 1 | 20 |
| Example 21 | 21 | 21 | 1 | 21 |
| Example 22 | 22 | 22 | 1 | 22 |
| Example 23 | 23 | 23 | 1 | 23 |
| Example 24 | 24 | 24 | 1 | 24 |
| Example 25 | 25 | 25 | 1 | 25 |
| Example 26 | 26 | 26 | 1 | 26 |
| Example 27 | 27 | 27 | 1 | 27 |
| Example 28 | 28 | 28 | 1 | 28 |
| Example 29 | 29 | 29 | 1 | 29 |
| Example 30 | 30 | 30 | 1 | 30 |
| Example 31 | 31 | 31 | 1 | 31 |
| Example 32 | 32 | 32 | 1 | 32 |
| Example 33 | 33 | 33 | 1 | 33 |
| Comparative Example 1 | 34 | 34 | 1 | 34 |
| Comparative Example 2 | 35 | 35 | 1 | 35 |
| Comparative Example 3 | 36 | 36 | 1 | 36 |
| Comparative Example 4 | 37 | 37 | 1 | 37 |
| Comparative Example 5 | 38 | 38 | 1 | 38 |
| Comparative Example 6 | 39 | 39 | 1 | 39 |
| Comparative Example 7 | 40 | 40 | 1 | 40 |

TABLE 5

| Example | Evaluation (1) | | Evaluation (2) | | | | |
|---|---|---|---|---|---|---|---|
| Comparative | Density | | Fogging | | Evaluation (3) | | Evaluation (4) |
| Example | difference | Evaluation | density | Evaluation | Roughness | Evaluation | Evaluation |
| Example 1 | 0.02 | A | 0.2 | A | 2.5 | A | A |
| Example 2 | 0.04 | A | 0.6 | A | 2.8 | A | A |
| Example 3 | 0.03 | A | 0.3 | A | 2.6 | A | A |
| Example 4 | 0.02 | A | 0.8 | A | 2.7 | A | A |
| Example 5 | 0.02 | A | 0.3 | A | 2.6 | A | A |
| Example 6 | 0.05 | A | 0.8 | A | 3.0 | A | A |
| Example 1 | 0.03 | A | 0.3 | A | 2.6 | A | A |
| Example 8 | 0.07 | A | 1.1 | B | 3.2 | A | A |
| Example 9 | 0.07 | A | 1.2 | B | 3.5 | A | A |
| Example 10 | 0.05 | A | 1.4 | B | 3.0 | A | A |
| Example 11 | 0.09 | A | 1.3 | B | 4.2 | B | A |
| Example 12 | 0.08 | A | 1.4 | B | 4.6 | B | A |
| Example 13 | 0.12 | B | 1.1 | B | 4.2 | B | B |
| Example 14 | 0.12 | B | 1.2 | B | 4.1 | B | C |
| Example 15 | 0.13 | B | 1.3 | B | 4.8 | B | C |
| Example 16 | 0.12 | B | 1.7 | C | 4.9 | B | C |
| Example 17 | 0.11 | B | 1.9 | C | 5.3 | C | C |
| Example 18 | 0.02 | A | 0.4 | A | 3.8 | A | B |
| Example 19 | 0.03 | A | 0.2 | A | 4.1 | B | B |
| Example 20 | 0.03 | A | 1.3 | B | 3.6 | A | A |
| Example 21 | 0.05 | A | 1.1 | B | 4.3 | B | B |
| Example 22 | 0.04 | A | 1.2 | B | 4.2 | B | B |
| Example 23 | 0.13 | B | 0.7 | A | 3.8 | A | B |
| Example 24 | 0.08 | A | 0.8 | A | 3.9 | A | B |
| Example 25 | 0.07 | A | 1.3 | B | 4.4 | B | B |
| Example 26 | 0.14 | B | 1.3 | B | 3.7 | A | B |
| Example 27 | 0.08 | A | 0.9 | A | 3.8 | A | B |
| Example 28 | 0.14 | B | 1.4 | B | 4.8 | B | B |

TABLE 5-continued

| Example | Evaluation (1) | | Evaluation (2) | | | | |
|---|---|---|---|---|---|---|---|
| Comparative | Density | | Fogging | | Evaluation (3) | | Evaluation (4) |
| Example | difference | Evaluation | density | Evaluation | Roughness | Evaluation | Evaluation |
| Example 29 | 0.13 | B | 1.3 | B | 4.8 | B | C |
| Example 30 | 0.17 | C | 1.8 | C | 5.1 | C | C |
| Example 31 | 0.16 | C | 1.8 | C | 5.6 | C | C |
| Example 32 | 0.18 | C | 1.7 | C | 4.7 | B | C |
| Example 33 | 0.19 | C | 1.7 | C | 5.3 | C | C |
| Comparative Example 1 | 0.16 | C | 3.2 | E | 5.7 | C | E |
| Comparative Example 2 | 0.15 | C | 1.6 | C | 7.8 | E | E |
| Comparative Example 3 | 0.17 | C | 2.3 | D | 6.3 | D | E |
| Comparative Example 4 | 0.22 | D | 1.7 | C | 6.6 | D | E |
| Comparative Example 5 | 0.31 | E | 1.8 | C | 5.5 | C | E |
| Comparative Example 6 | 0.17 | C | 3.6 | E | 7.9 | E | E |
| Comparative Example 7 | 0.41 | E | 3.8 | E | 5.8 | C | E |

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-012504, filed Jan. 28, 2021, and Japanese Patent Application No. 2021-213008, filed Dec. 27, 2021, which are hereby incorporated by reference herein in their entirety.

What is claimed is:

1. A magnetic carrier comprising:

a magnetic core; and a coating resin that covers a surface of the magnetic core, wherein:

the coating resin comprises a resin A and a resin B;

a content of the resin A is 1 to 50% by mass, and a content of the resin B is 50 to 99% by mass, with respect to the total mass of the coating resin;

the resin A has a unit Y1 represented by formula (1) and a unit Y2 represented by formula (2), and in the resin B, a content of the unit Y2 represented by formula (2) is 0.1% by mass or less; and when a mass of the resin A, a mass of the unit Y1 in the resin A, and a mass of the unit Y2 in the resin A are represented by X, Ma and Mb, respectively, the X, the Ma and the Mb satisfy expressions (a) and (b):

$$0.90 \leq (Ma+Mb)/X \leq 1.00 \quad \text{(a), and}$$

$$1.00 \leq Ma/Mb \leq 30.0 \quad \text{(b),}$$

and when an SP value of the unit Y1 and an SP value of the resin B are represented by SPa and SPb, respectively, the SPa and the SPb satisfy expression (c):

$$0 \leq |SPa-SPb| \leq 2.0 \quad \text{(c),}$$

wherein in formula (1), $R_1$ represents H or $CH_3$, and $R_2$ represents a hydrocarbon group having 1 to 8 carbon atoms and optionally having a substituent, wherein the substituent is a hydroxy group or a carboxy group; and in formula (2), $R_3$ represents H or $CH_3$, $R_4$ represents H or $CH_3$, $R_5$ represents a single bond or a hydrocarbon group having 1 to 10 carbon atoms, $R_6$ represents a hydrocarbon group having 1 to 10 carbon atoms, $R_7$ represents H, $CH_3$ or $Si(CH_3)_3$, and n represents an integer of 2 to 150

(1)

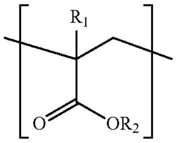

(2)

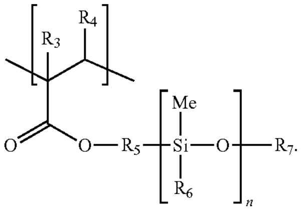

2. The magnetic carrier according to claim 1, wherein the resin B comprises 75% by mass or more of the unit Y1 represented by formula (1).

3. The magnetic carrier according to claim 1, wherein n in formula (2) is 5 or larger and 60 or smaller.

4. The magnetic carrier according to claim 1, wherein Si on the surface of the magnetic carrier as measured by electron spectroscopy for chemical analysis (ESCA) is 1.0 to 15.0 atom %.

5. The magnetic carrier according to claim 1, wherein when a sum of numbers of the units Y1 and the units Y2 represented by formula (1) and formula (2) is represented by m, the following expression is satisfied:

$$50 \leq m \leq 250.$$

6. The magnetic carrier according to claim 1, wherein the coating resin contains 1 to 20% by mass of the resin A and contains 80 to 99% by mass of the resin B.

7. The magnetic carrier according to claim 1, wherein the resin B comprises a unit Y3 represented by following formula (3), and the content of the unit Y3 is 1 to 75% by mass based on the resin B:

(3)

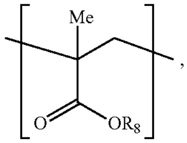

, wherein $R_8$ represents a cyclohexyl group, a cycloheptyl group, a cyclooctyl group, a cyclopentyl group, a cyclobutyl group or a cyclopropyl group.

8. The magnetic carrier according to claim 1, wherein the resin B comprises a polymer in which a styrene-acrylic resin is graft-polymerized to polypropylene.

9. A two-component developer comprising a magnetic carrier and toner, wherein the magnetic carrier comprises:

a magnetic core; and a coating resin that covers a surface of the magnetic core, wherein:

the coating resin comprises a resin A and a resin B;

a content of the resin A is 1 to 50% by mass, and a content of the resin B is 50 to 99% by mass, with respect to the total mass of the coating resin;

the resin A has a unit Y1 represented by formula (1) and a unit Y2 represented by formula (2), and in the resin B, a content of the unit Y2 represented by formula (2) is 0.1% by mass or less; and when a mass of the resin A, a mass of the unit Y1 in the resin A, and a mass of the unit Y2 in the resin A are represented by X, Ma and Mb, respectively, the X, the Ma and the Mb satisfy expressions (a) and (b):

$$0.90 \leq (Ma+Mb)/X \leq 1.00 \quad \text{(a), and}$$

$$1.00 \leq Ma/Mb \leq 30.0 \quad \text{(b),}$$

and when an SP value of the unit Y1 and an SP value of the resin B are represented by SPa and SPb, respectively, the SPa and the SPb satisfy expression (c):

$$0 \leq |SPa-SPb| \leq 2.0 \quad \text{(c),}$$

wherein in formula (1), $R_1$ represents H or $CH_3$, and $R_2$ represents a hydrocarbon group having 1 to 8 carbon atoms and optionally having a substituent, wherein the substituent is a hydroxy group or a carboxy group; and in formula (2), $R_3$ represents H or $CH_3$, $R_4$ represents H or $CH_3$, $R_5$ represents a single bond or a hydrocarbon group having 1 to 10 carbon atoms, $R_6$ represents a hydrocarbon group having 1 to 10 carbon atoms, $R_7$ represents H, $CH_3$ or $Si(CH_3)_3$, and n represents an integer of 2 to 150

(1)

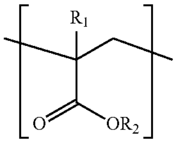

(2)

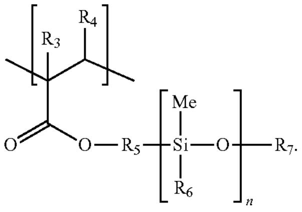

.

10. A replenishment developer comprising a magnetic carrier, wherein the magnetic carrier comprising:

a magnetic core; and a coating resin that covers a surface of the magnetic core, wherein:

the coating resin comprises a resin A and a resin B;

a content of the resin A is 1 to 50% by mass, and a content of the resin B is 50 to 99% by mass, with respect to the total mass of the coating resin;

the resin A has a unit Y1 represented by formula (1) and a unit Y2 represented by formula (2), and in the resin B, a content of the unit Y2 represented by formula (2) is 0.1% by mass or less; and when a mass of the resin A, a mass of the unit Y1 in the resin A, and a mass of the unit Y2 in the resin A are represented by X, Ma and Mb, respectively, the X, the Ma and the Mb satisfy expressions (a) and (b):

$$0.90 \leq (Ma+Mb)/X \leq 1.00 \quad \text{(a), and}$$

$$1.00 \leq Ma/Mb \leq 30.0 \quad \text{(b),}$$

and when an SP value of the unit Y1 and an SP value of the resin B are represented by SPa and SPb, respectively, the SPa and the SPb satisfy expression (c):

$$0 \leq |SPa-SPb| \leq 2.0 \quad \text{(c),}$$

wherein in formula (1), $R_1$ represents H or $CH_3$, and $R_2$ represents a hydrocarbon group having 1 to 8 carbon atoms and optionally having a substituent, wherein the substituent is a hydroxy group or a carboxy group; and in formula (2), $R_3$ represents H or $CH_3$, $R_4$ represents H or $CH_3$, $R_5$ represents a single bond or a hydrocarbon group having 1 to 10 carbon atoms, $R_6$ represents a hydrocarbon group having 1 to 10 carbon atoms, $R_7$ represents H, $CH_3$ or $Si(CH_3)_3$, and n represents an integer of 2 to 150

(1)

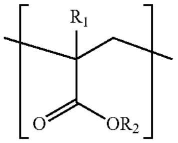

-continued
(2)
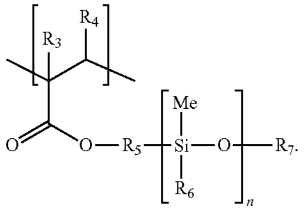
* * * * *